(12) United States Patent
Ott et al.

(10) Patent No.: US 7,040,675 B1
(45) Date of Patent: May 9, 2006

(54) LINKAGE OPERATED LATCHING SYSTEM

(75) Inventors: Brian M. Ott, Huntley, IL (US); Michael O. Misner, Lake Villa, IL (US); Thomas Heinrich, Streamwood, IL (US); Timothy P. Laabs, Palatine, IL (US)

(73) Assignee: The Eastern Company, Wheeling, IL (US)

( * ) Notice: Subject to any disclaimer, the term of this patent is extended or adjusted under 35 U.S.C. 154(b) by 53 days.

(21) Appl. No.: 10/772,486

(22) Filed: Feb. 5, 2004

Related U.S. Application Data

(60) Provisional application No. 60/447,153, filed on Feb. 12, 2003.

(51) Int. Cl.
E05C 3/06 (2006.01)

(52) U.S. Cl. .......................... 292/216; 292/26; 292/28; 292/36; 292/38; 292/50; 292/53; 292/123; 292/125; 292/141; 292/144; 292/201; 292/DIG. 36; 292/DIG. 43; 70/279.1; 296/100.07

(58) Field of Classification Search ............... 70/283.1, 70/279.1–283; 296/100.05, 100.07, 50, 57.1; 292/216, 26, 28, 30, 36, 38, 42, 48, 50, 53, 292/54, 123, 125, 128, 141, 144, 145, 167, 292/171, 175, DIG. 11, DIG. 29, DIG. 36, 292/DIG. 43, 201
See application file for complete search history.

(56) References Cited

U.S. PATENT DOCUMENTS

| | | | | |
|---|---|---|---|---|
| 243,374 A | * | 6/1881 | Howard ........................ 292/48 |
| 1,387,573 A | * | 8/1921 | Wilson ......................... 292/36 |
| 2,218,683 A | * | 10/1940 | Miller .......................... 70/240 |
| 2,285,301 A | * | 6/1942 | Nelson ......................... 292/126 |
| 2,729,089 A | | 1/1956 | Pelcin .......................... 70/151 |
| 2,735,706 A | | 2/1956 | Pelcin .......................... 292/34 |
| 2,756,990 A | * | 7/1956 | Reamey ........................ 307/155 |
| 2,911,247 A | * | 11/1959 | Corbin ......................... 292/48 |
| 3,177,022 A | * | 4/1965 | Mckee et al. ................. 292/50 |
| 3,333,878 A | | 8/1967 | Pelcin .......................... 292/37 |
| 3,396,999 A | * | 8/1968 | Knapp ......................... 292/39 |
| 3,413,025 A | * | 11/1968 | Sperry ......................... 292/111 |
| 3,683,652 A | * | 8/1972 | Halopoff et al. .............. 70/467 |
| 3,744,829 A | * | 7/1973 | Germer ........................ 292/22 |
| 3,933,382 A | | 1/1976 | Counts et al. ............. 292/144 |
| 3,996,591 A | * | 12/1976 | Hayward ....................... 292/3 |
| 4,068,871 A | * | 1/1978 | Mercer ......................... 292/48 |
| 4,254,582 A | * | 3/1981 | McGee ......................... 49/199 |
| 4,273,368 A | * | 6/1981 | Tanaka ......................... 292/53 |
| 4,641,865 A | | 2/1987 | Pastva .......................... 292/5 |
| 4,703,961 A | | 11/1987 | Weinerman et al. ........ 292/216 |
| 4,892,338 A | | 1/1990 | Weinerman et al. .......... 292/35 |
| 4,896,906 A | | 1/1990 | Weinerman et al. .......... 292/48 |
| 4,917,412 A | | 4/1990 | Swan et al. .................. 292/48 |
| 5,069,491 A | | 12/1991 | Weinerman et al. .......... 292/48 |
| 5,117,665 A | | 6/1992 | Swan et al. .................. 70/264 |
| 5,183,310 A | * | 2/1993 | Shaughnessy ............... 296/106 |

(Continued)

*Primary Examiner*—Brian E. Glessner
*Assistant Examiner*—Carlos Lugo
(74) *Attorney, Agent, or Firm*—David A. Burge

(57) ABSTRACT

A latching system includes a control unit that houses a remote signal responsive relay and a crank arm that is pivoted by the armature of the relay when the relay is energized to oppositely move a pair of elongate links each of which is connected to a separate latch assembly for moving operating arms of the latch assemblies to unlatched positions for causing the latch assemblies to release their latched engagement with strikers that hold a closure closed.

29 Claims, 21 Drawing Sheets

U.S. PATENT DOCUMENTS

| | | | |
|---|---|---|---|
| 5,299,722 A | 4/1994 | Cheney | 224/273 |
| 5,350,213 A * | 9/1994 | Bernardo | 296/98 |
| 5,392,025 A | 2/1995 | Figh et al. | 340/545 |
| 5,394,718 A * | 3/1995 | Hotzl | 70/283.1 |
| 5,487,289 A * | 1/1996 | Otto et al. | 70/279.1 |
| 5,493,881 A | 2/1996 | Harvey | 70/277 |
| 5,531,086 A * | 7/1996 | Bryant | 70/279.1 |
| 5,532,521 A | 7/1996 | Leininger | 307/10.2 |
| 5,595,076 A | 1/1997 | Weinerman et al. | 70/208 |
| 5,595,409 A * | 1/1997 | Fier et al. | 292/112 |
| 5,636,536 A * | 6/1997 | Kinnucan | 70/107 |
| 5,755,126 A | 5/1998 | Lanigan et al. | 70/257 |
| 5,781,399 A | 7/1998 | Lanigan et al. | 361/172 |
| 5,806,355 A | 9/1998 | Lanigan et al. | 70/257 |
| 5,884,948 A | 3/1999 | Weinerman et al. | 292/216 |
| 5,951,068 A * | 9/1999 | Strong et al. | 292/39 |
| 6,027,148 A * | 2/2000 | Shoemaker | 292/216 |
| 6,049,448 A | 4/2000 | Lanigan et al. | 361/172 |
| 6,050,116 A * | 4/2000 | Cole | 70/256 |
| 6,068,305 A | 5/2000 | Myers et al. | 292/201 |
| 6,086,131 A | 7/2000 | Bingle et al. | 296/76 |
| 6,116,067 A | 9/2000 | Myers et al. | 70/279.1 |
| 6,185,773 B1 | 2/2001 | Goedde | 7/540 |
| 6,203,167 B1 * | 3/2001 | Liu et al. | 362/133 |
| 6,326,754 B1 | 12/2001 | Mullet et al. | 318/480 |
| 6,343,494 B1 * | 2/2002 | Roos et al. | 70/264 |
| 6,349,984 B1 * | 2/2002 | Marrazzo et al. | 292/336.3 |
| 6,354,650 B1 | 3/2002 | Terhaar et al. | 296/106 |
| 6,374,649 B1 | 4/2002 | Holcomb et al. | 70/78 |
| 6,409,064 B1 | 6/2002 | Bayley | 224/404 |
| 6,427,500 B1 | 8/2002 | Weinerman et al. | 70/135 |
| 6,454,320 B1 | 9/2002 | Weinerman et al. | 292/56 |
| 6,471,260 B1 | 10/2002 | Weinerman et al. | 292/216 |
| 6,490,895 B1 | 12/2002 | Weinerman et al. | 70/208 |
| 6,497,445 B1 | 12/2002 | Combs, II | 296/100.07 |
| 6,624,758 B1 | 9/2003 | Omata et al. | 340/825.69 |
| D486,258 S * | 2/2004 | Cannon et al. | D26/51 |

* cited by examiner

LINKAGE OPERATED LATCHING SYSTEM

REFERENCE TO PROVISIONAL APPLICATION

This application claims the benefit of U.S. provisional application Ser. No. 60/447,153 entitled LINKAGE OPERATED LATCHING SYSTEM filed Feb. 12, 2003 by Brian M. Ott et al, the disclosure of which is incorporated herein by reference.

REFERENCE TO SUBJECT-MATTER-RELATED APPLICATION

Reference is made to a concurrently-filed application that also claims the benefit of the provisional application identified above, namely application Ser. No. 10/772,486 filed by Brian M. Ott et al entitled DUAL ACTUATOR OPERATED ROTARY LATCH, the disclosure of which is incorporated herein by reference.

BACKGROUND OF THE INVENTION

The present invention relates to linkage operated latching systems of the type used to releasably retain pivoted closures in closed positions, such as the tonneau covers of pickup trucks and the lids of large tool boxes and storage units that often are carried by pickup trucks or stationed at job sites where construction work is underway, wherein the operating mechanisms employed to effect unlatching of the closures, covers and lids are connected by one or more rigid or flexible links to latch components that must be pivoted or translated to effect unlatching of the latches so the closures, covers and lids can be opened.

Tonneau covers of pickup trucks typically employ hinges located near left and right forward end regions of the covers to pivotally connect the forward end regions to the bodies of pickup trucks, or to rails that are mounted on the bodies to extend along opposite sides of the beds of pickup trucks. The forwardly located hinges permit rearward portions of the tonneau covers to be pivoted between open and closed positions to permit and prevent access to the pickup truck beds. Latch assemblies typically are carried on left and right rearward end regions of the tonneau covers and are configured to engage strikers that either are carried by the left and right rear end regions of the bodies of the pickup trucks, or by the rails that are mounted on the bodies to extend along left and right sides of the pickup truck beds.

Tool boxes and job-site storage units also typically employ closures, covers or lids that are hinged near one side or end region, with the opposed side or end region being releasably held closed by latch assemblies located near left and right portions thereof. In some instances, the latches are carried by the closures and are arranged to engage strikers that are carried by base portions of the tool boxes or storage units. In other instances, the mounting locations of the latches and strikers are reversed, with the latches being carried by the base portions of the tool boxes or storage units, and being arranged to engage strikers that are carried by the closures.

To operate a pair of left and right latch assemblies that are used to releasably hold closed the tonneau cover of a pickup truck or the closure or lid of a tool box or storage unit, it is common to provide an operating mechanism that is situated somewhere between the left and right latch assemblies. The operating mechanism is connected to the left and right latch assemblies by links that extend leftwardly and rightly from the operating mechanism. When the operating mechanism is actuated so as to pull the leftwardly and rightwardly extending links generally toward each other (or, in some instances, to push the links generally away from each other), the resulting oppositely directed movements of the links cause corresponding oppositely directed movements of operating components of the left and right latch assemblies to effect operation or unlatching of the latch assemblies. When the left and right latch assemblies are operated, they release strikers that normally are latchingly retained by the left and right latch assemblies when the closures, covers or lids are closed. When the latch assemblies release the strikers, the closures, covers and lids may be pivoted open without encountering obstruction or interference from the latch assemblies.

To prevent unwanted or unauthorized opening of a tonneau cover, tool box lid or the like, the operating mechanism usually is provided with a key operated lock. In operating mechanisms of the type having one or more handles that are movable relative to a housing that supports the handle or handles to effect unlatching movements of the leftwardly and rightwardly extending links, the key operated lock usually serves, when locked, either 1) to prevent handle movement relative to the housing to thereby prevent the handle or handles from causing any unlatching movements of the links, or 2) to disconnect the handle or handles from the links to ensure that any handle movement that may take place relative to the housing is not transmitted to the links so that handle movements do not cause unlatching movements of the links.

One disclosure of a tonneau cover that employs left and right forwardly located hinge assemblies to pivotally mount the cover, and that employs left and right latch assemblies operated by a centrally located, rearwardly mounted handle and housing assembly that is connected to the latch assemblies by leftwardly and rightwardly extending links is provided by U.S. Pat. No. 6,427,500 issued Aug. 6, 2002 entitled LATCH, LOCK AND HINGE SYSTEM FOR USE WITH CLOSURES SUCH AS TONNEAU COVERS, assigned to The Eastern Company, referred to hereinafter as the "Latch, Lock and Hinge System Patent," the disclosure of which is incorporated herein by reference.

The left and right latch assemblies disclosed in the Latch, Lock and Hinge System Patent are of a rotary type. Each employs a latch bolt that defines a recess of generally U-shaped configuration. Each latch bolt can pivot relative to a housing of the latch assembly between unlatched and latched positions. When the latch bolt is in its unlatched position, the U-shaped recess faces toward a striker that can be moved into and out of the recess as the cover is moved toward and away from its fully closed position. When the closure, cover or lid is moved to its fully closed position, the striker moves into the U-shaped recess and causes the latch bolt to pivot to its latched position wherein another component of the latch assembly, typically a spring biased pawl, engages the pivotal latch bolt to retain the latch bolt in its latched position. The latch bolt is retained in its latched position by the spring biased pawl until the latch is operated or unlatched to release its retaining engagement with the striker, which is accomplished by pivoting the pawl to move the pawl out of engagement with the striker. When the pawl releases the latch bolt, the latch bolt pivots toward its unlatched position under the influence of a spring that biases the latch bolt toward its unlatched position.

Other details and features of linkage operated rotary latches of the type described above, and other types of latching systems that employ rotary latches of the general type described above, are disclosed in other patents of The Eastern Company that include U.S. Pat. Nos. 6,490,895, 6,471,260, 6,454,320, 5,884,948, 5,595,076, 5,117,665, 5,069,491, 4,917,412, 4,896,906 and 4,703,961, referred to hereinafter as the "Rotary Latch Patents," the disclosures of which are incorporated herein by reference.

Operating mechanisms that can be connected by one or more rigid or flexible links to one or more latch assemblies for operating the latch or latches in response to handle movement, or in some instances, in response to energization of an electrically operated solenoid, are disclosed in patents assigned to The Eastern Company that include U.S. Pat. Nos. 6,490,895, 6,454,320, 6,427,500, 5,595,076, 5,117, 665, 5,069,491, 4,917,412, 4,896,906, 4,892,338, 4,641,865, 3,333,878, 2,735,706 and 2,729,089, referred to hereinafter as the "Opposed Link Operating Mechanism Patents," the disclosures of which are incorporated herein by reference.

When it has proven necessary for a rotary latch of the type disclosed in the Rotary Latch Patents to be operable (i.e., "unlatchable") in response to movement of one or the other of a pair of links (with each of the links constituting an element of a separate operating mechanism), one approach that has been taken to address this need is disclosed in the aforementioned U.S. Pat. Nos. 5,117,665, 5,069,491, 4,917, 412 and 4,896,906 (referred to hereinafter as the "Rotary Latch With Dual Operating Arms Patents"). The approach taken in these patents calls for a rotary latch assembly to be provided not with a single operating arm, but rather with a pair of pivotal operating arms arranged side by side, with each of the operating arms being pivotally connected to the housing of the latch for independent movement (i.e., the arms pivot independently so that pivoting of one of the operating arms does not cause pivoting of the other of the arms), and with each of the operating arms being connected to a separate one of the pair of links so that each operating arm pivots in response to movement of a link component of a separate operating mechanism.

While the dual operating arm approach disclosed in the Rotary Latch With Dual Operating Arms Patents has served satisfactorily in the environments disclosed in the Rotary Latch With Dual Operating Arms Patents, this approach tends to be unsuitable for use with tonneau cover latching systems wherein rotary latches often need to be operated (i.e., to be "unlatched") by a pair of links that travel through different distances, by links that move along unaligned paths of travel when they operate the latch, and/or by links that have other characteristics that are not easily accommodated by the dual operating arm approach. A simpler approach that permits the two links to connect with a single operating arm would be preferred (instead of employing a pair of operating arms each connected to a separate operating mechanism link) if a way could be found to permit each of the links to move the single operating arm without causing concurrent movement of the other of the links.

Latching systems that respond to remotely transmitted signals sent from hand held, pocket size, push button actuated transmitters have come into wide use during recent years. As transmitters and receivers have become more sophisticated and secure, and as the cost of this technology has diminished, remote signal responsive latching systems have increasingly been employed in securing passenger doors and trunk compartments of passenger vehicles, tonneau covers, tool box lids and the like.

The character and design of transmitters and receivers that utilize radio signals or infrared light or other modes of signal transmission to operate an electrical switch that completes and electrical circuit to operate an electrical solenoid are well known, are commercially available, and are utilized by, but do not form a part of, the present invention. One commercially available remote signal transmitter and receiver system that is referred to later herein as the "Remote Signal Unit" is sold by Iowa Export-Import, Des Moines, Iowa 50309 and can be specified by ordering part or model number "MULTI-RCU7-IL."

SUMMARY OF THE INVENTION

The present invention relates to improvements in linkage operated latching systems of the general type used to releasably retain in closed position the tonneau covers of pickup trucks and other closures such as the lids and covers of large tool boxes, job-site storage containers, and the like—latching systems that employ dual actuators or dual operating mechanisms each connected by its own latch operating link or links to one or more latch assemblies that are operable or "unlatchable" when one or the other of the actuators or operating mechanisms causes its latch operating link or links to execute an unlatching movement.

Tonneau covers and the lids or closures of large tool and storage boxes typically are held in their fully closed positions by left and right latch assemblies that are operated or unlatched by links that connect the left and right latch assemblies to operating mechanisms that are stationed at convenient locations, for example at heights above floor level that are within reach without requiring a person to stoop, and typically at locations centered between the left and right latch assemblies where handles can be grasped with ease, and wherein key slots can be viewed and keys inserted therein with ease when the time is at hand to unlock the operating mechanisms so their handles can be moved operate or unlatch the latches. One aspect of the present invention relates to the provision of latching system components that can be added to linkage operated latching systems of the type just described to enable the left and right latch assemblies to also be operated or unlatched in response to the remote transmission of signals from pocket size, battery operated signal transmitter units that are carried by persons who are authorized to open the closures, covers or lids.

When a tonneau cover, tool box or storage container is provided with a remote signal responsive unlatching capability, the tonneau cover, tool box or storage container can be unlocked quickly and efficiently in response to a remote signal as an authorized person walks toward the tonneau cover, tool box or storage container, hence no time need be wasted fiddling with a ring of keys to find, insert and turn the correctly configured key when one reaches the tonneau cover, tool box or storage container.

One aspect of the present invention relates to the provision of a versatile type of remote signal responsive operating mechanism or "control unit" that is well suited for use with a wide variety of linkage operated latching systems. The control unit of the present invention is configured so that it may be used with great versatility to accommodate the use of rigid or flexible links; links that vary widely in configuration in order to be installed in out-of-the-way locations on tonneau covers, tool boxes and storage containers; and arrangements of latches and strikers that may need to differ from one system to the next in order to provide appropriate levels of security and in order to accommodate differently configured vehicles, tool boxes and storage containers, and differently configured closures, covers and lids for use therewith.

In one form of preferred practice, a latching system includes an operating mechanism mountable on a closure for operating a latch assembly mounted on the closure to release latched engagement of the latch assembly with a striker formation that retains the closure in a closed position. The operating mechanism includes a control unit mountable on the closure and including an enclosure that houses a first crank arm for pivotal movement about a first pivot axis between a non-operated position and an operated position, and that houses components of a signal responsive relay mechanism having an armature that is connected to the first crank arm for pivoting the first crank arm about the first pivot axis from the non-operated position to the operated position in response to receipt by the signal responsive relay mechanism of a signal sent from a location remote to the closure, and wherein an opening is defined by the enclosure for providing access from outside the enclosure to the first crank arm; and, an elongate link configured to extend through the opening of the enclosure and being connectable 1) to the latch assembly for being moved along a path of travel from a normal position of the elongate link to an actuated position of the link to operate the latch assembly to release latched engagement of the latch assembly with the striker formation. When the first crank arm is pivoted from the non-operated position to the operated position, the elongate link is caused to move along the path of travel to operate the latch assembly to release the latched engagement of the latch assembly with the striker formation to permit the closure to move away from the closed position.

Other aspects of the invention relate to linkage operated latching system improvements that enable one or more latch assemblies, for example the left and right rotary latch assemblies of a tonneau cover or tool box lid, to be operated in response to dual actuators or dual operating mechanisms. For example, features of the present invention enable an operating arm of a latch assembly to be moved to operate or unlatch the latch assembly not only in response to link movement initiated by a manually actuated operating mechanism such as key controlled handle and housing assembly, but also in response to link movement initiated by a remote signal responsive operating mechanism or control unit of the type described above. In preferred practice, the link that connects an operating arm of a latch assembly with a manually operated actuator or operating mechanism is not caused to move when the operating arm is moved by another link that connects the operating arm with the signal responsive operating mechanism, and vice versa.

Included in the disclosure hereof, but claimed in the concurrently-filed subject-matter-related case referenced above, is a rotary latch that has an operating arm pivotally connected to the housing of the latch for movement between non-operated and operated positions for releasing a pawl of the latch to permit a rotary bolt of the latch to release latched engagement with a striker that is gripped by the bolt when the latch is latched. Connected to the operating arm are a pair of links, each of which can be moved to pivot the operating arm from the non-operated position to the operated position. To ensure that unlatching movement of one of the links does not cause corresponding unlatching movement of the other of the links, one or more lost motion connections are employed to couple one or both of the links to the operating arm. In preferred practice, the lost motion connections are provided by slots formed in the operating arm—slots in which end formations of the links, or connectors attached to end regions of the links, may slide to permit the operating arm to pivot from the non-operated position to the operated position without causing corresponding unlatching movement of one or both of the links.

The slotted operating arms may be utilized, in methods and manners that are disclosed herein, to provide momentum assisted operation of latch assemblies, and to provide latch assemblies capable of being operated by two or more sets of links wherein the links of each set move independently so that movements of the links of one set cause no corresponding movements of the links of another set.

BRIEF DESCRIPTION OF THE DRAWINGS

These and other features, and a fuller understanding of the invention may be had by referring to the following description and claims, taken in conjunction with the accompanying drawings, wherein:

Figure 1:
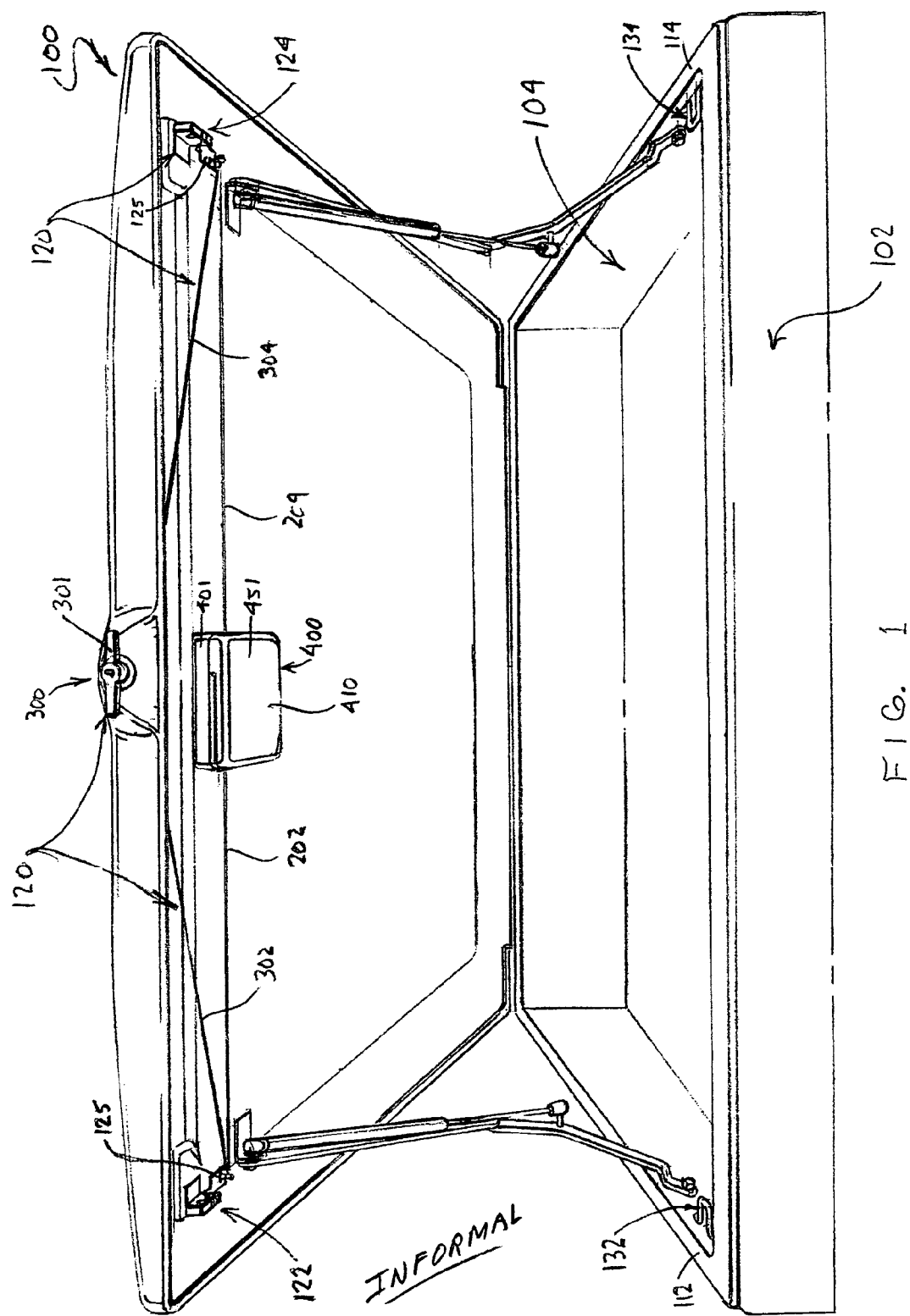
FIG. 1 is a perspective view showing a closure such as the tonneau cover of a pickup truck or the lid of a sizable tool box or storage container pivoted to an open position to provide access to the bed of the pickup truck or to the interior of the tool box or storage container, and components of a linkage operated latching system for releasably retaining the closure, cover or lid in a closed position, including a control box of a remotely transmitted signal responsive operating mechanism connected by a first pair links to left and right latch rotary latch assemblies, and a handle and housing type of manual operating mechanism that is connected by a second pair of links to the left and right rotary latch assemblies.
Figure 2:
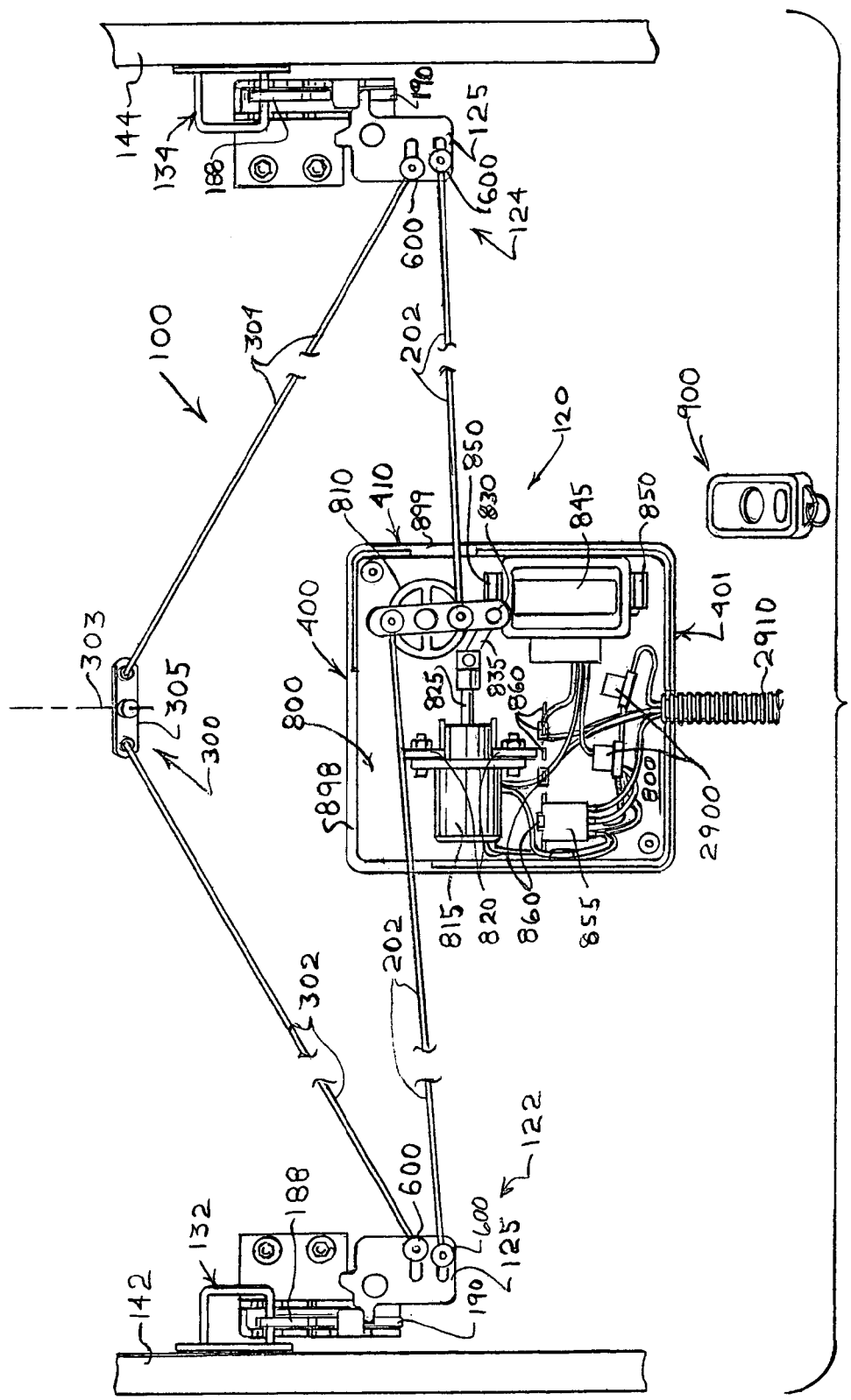
FIG. 2 is a foreshortened schematic depiction of selected elements of the linkage operated latching system of FIG. 1, with the strikers shown mounted on left and right rails rather than on left and right portions of the body of a pickup truck, with the latch assemblies latched into retaining engagement with the strikers, with the cover of the control box removed, with portions of a wiring harness that supplies electrical energy to the control box and that electrically interconnects selected components of the control box added, and with a pocket size, push button remote signal transmitter also being shown.
Figure 7:
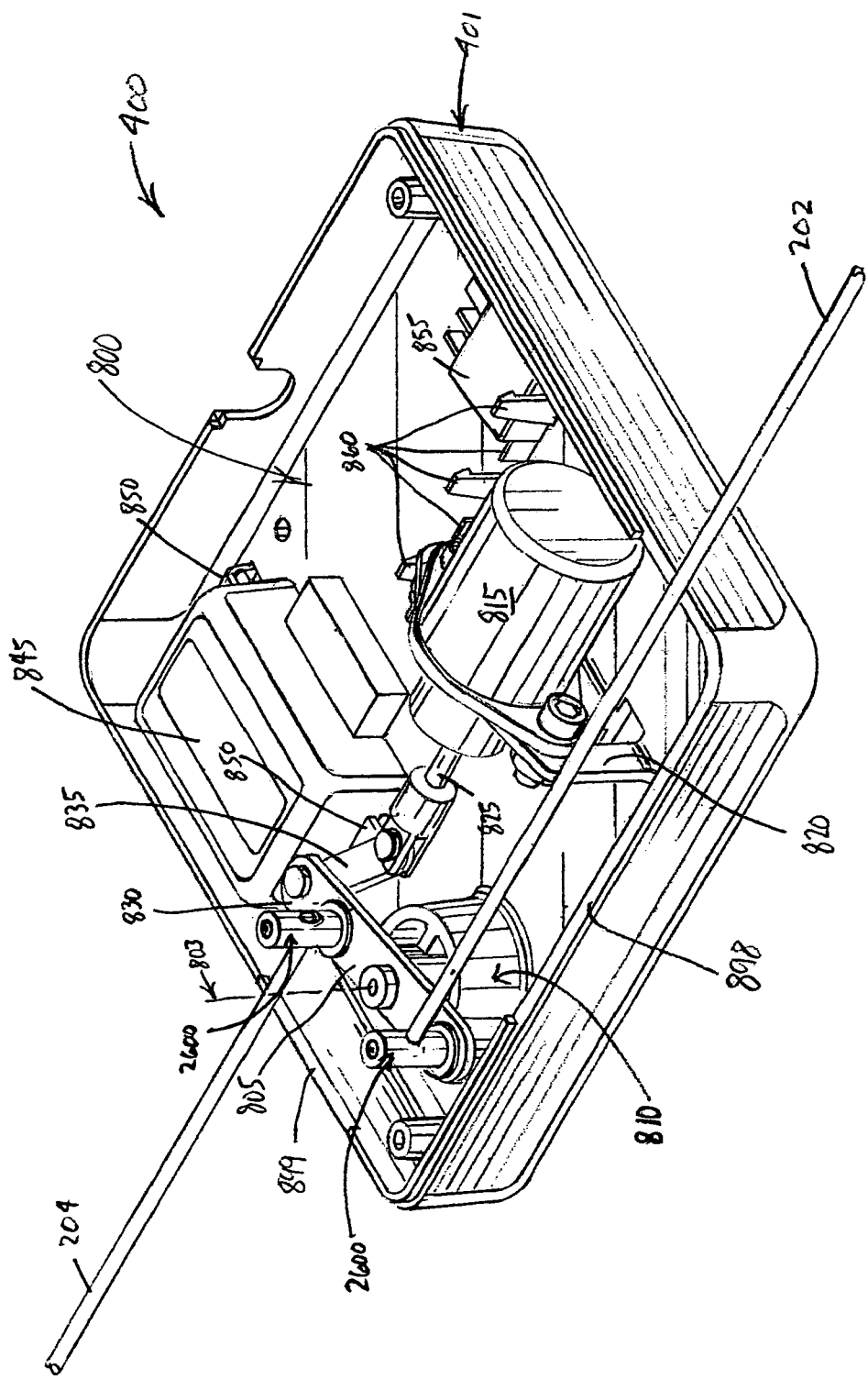
FIG. 7 is a perspective view of the base of the control units of FIGS. 1–6 with the covers thereof removed to permit interior components that also are depicted in FIG. 2 to be seen, with a crank arm to which leftwardly and rightwardly extending links are connected being in its normal, non-operated position, and with the armature of an electrically operated solenoid and the link that connects the armature to the crank arm also being in their normal, non-operated positions.
Figure 8:
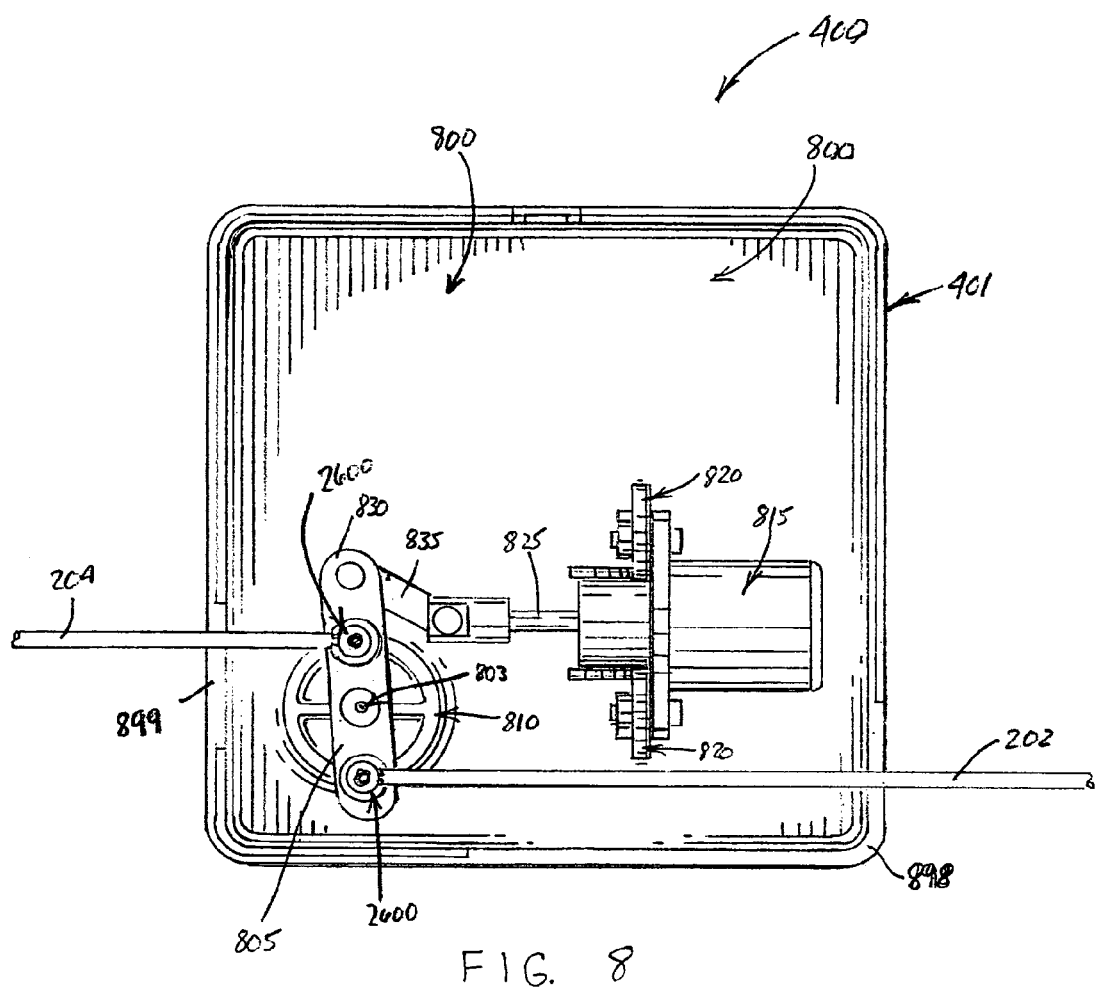
Figure 9:
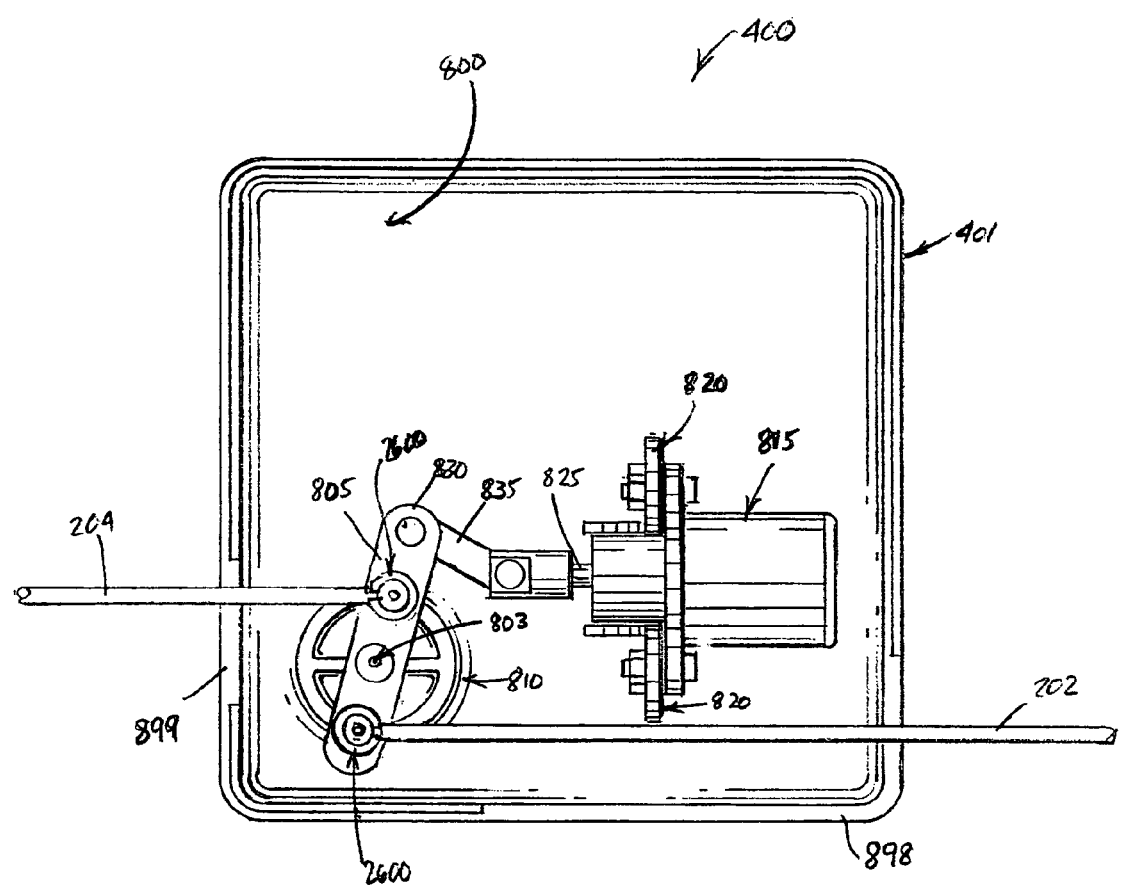
Figure 10:
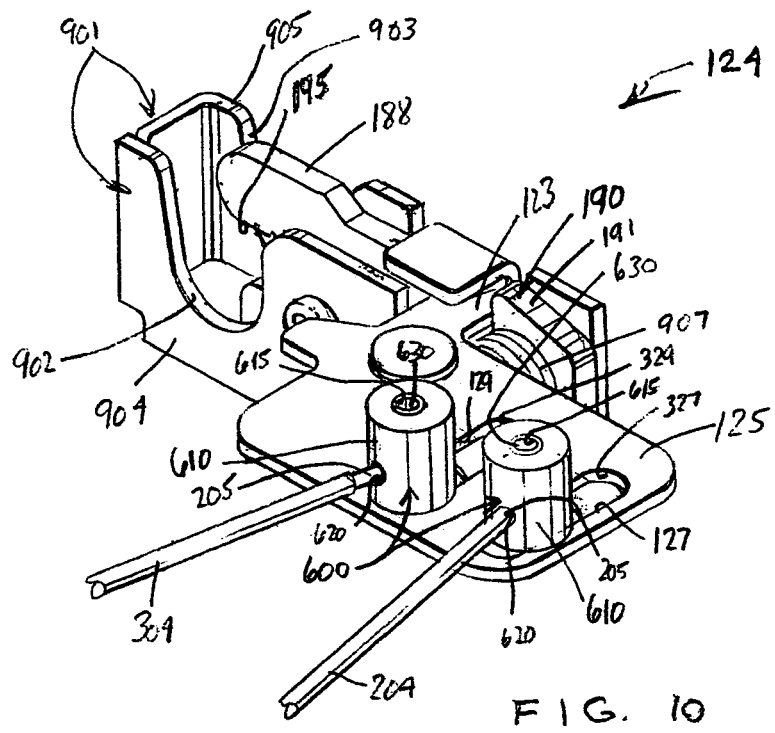
Figure 11:
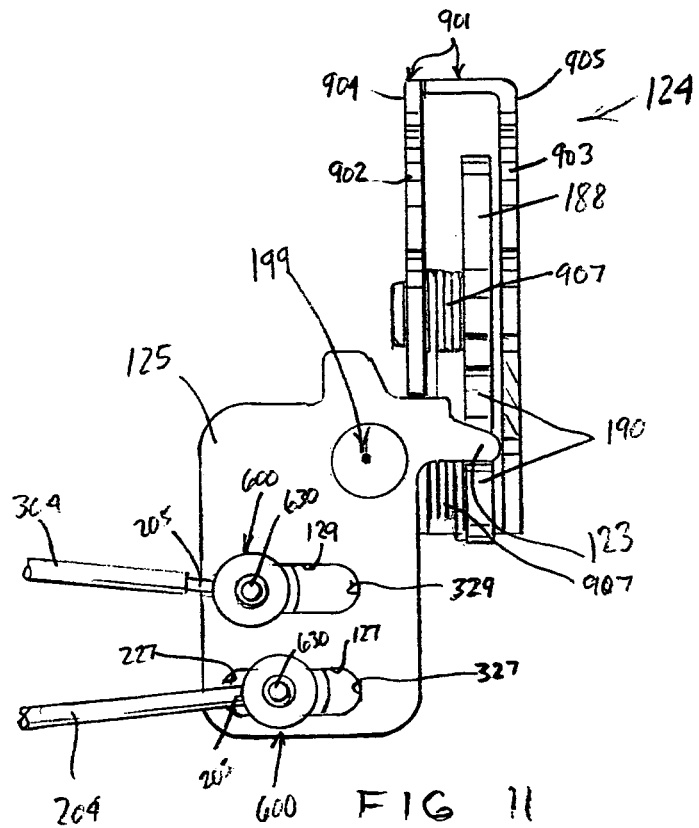
Figures 12, 13:
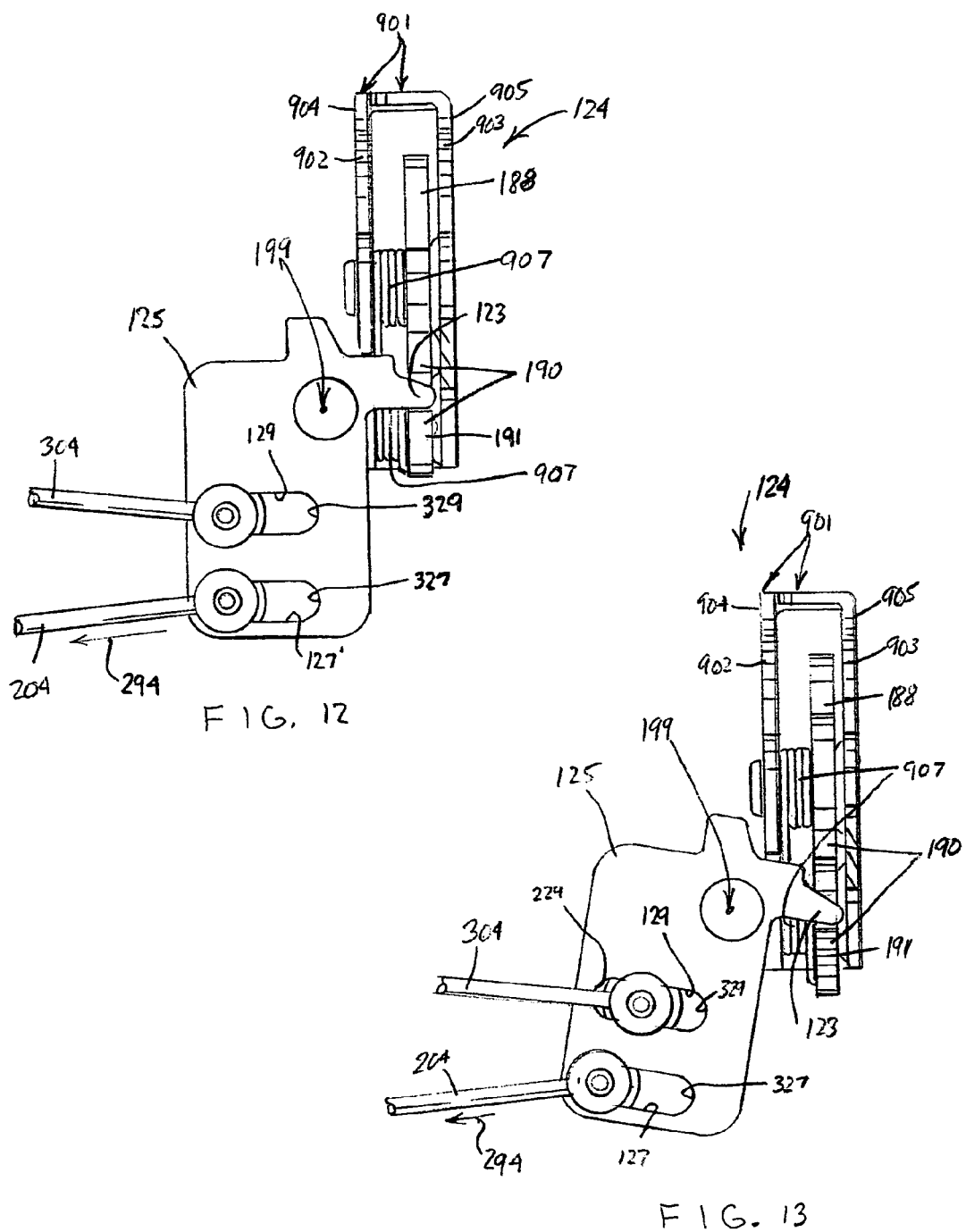
Figure 14:
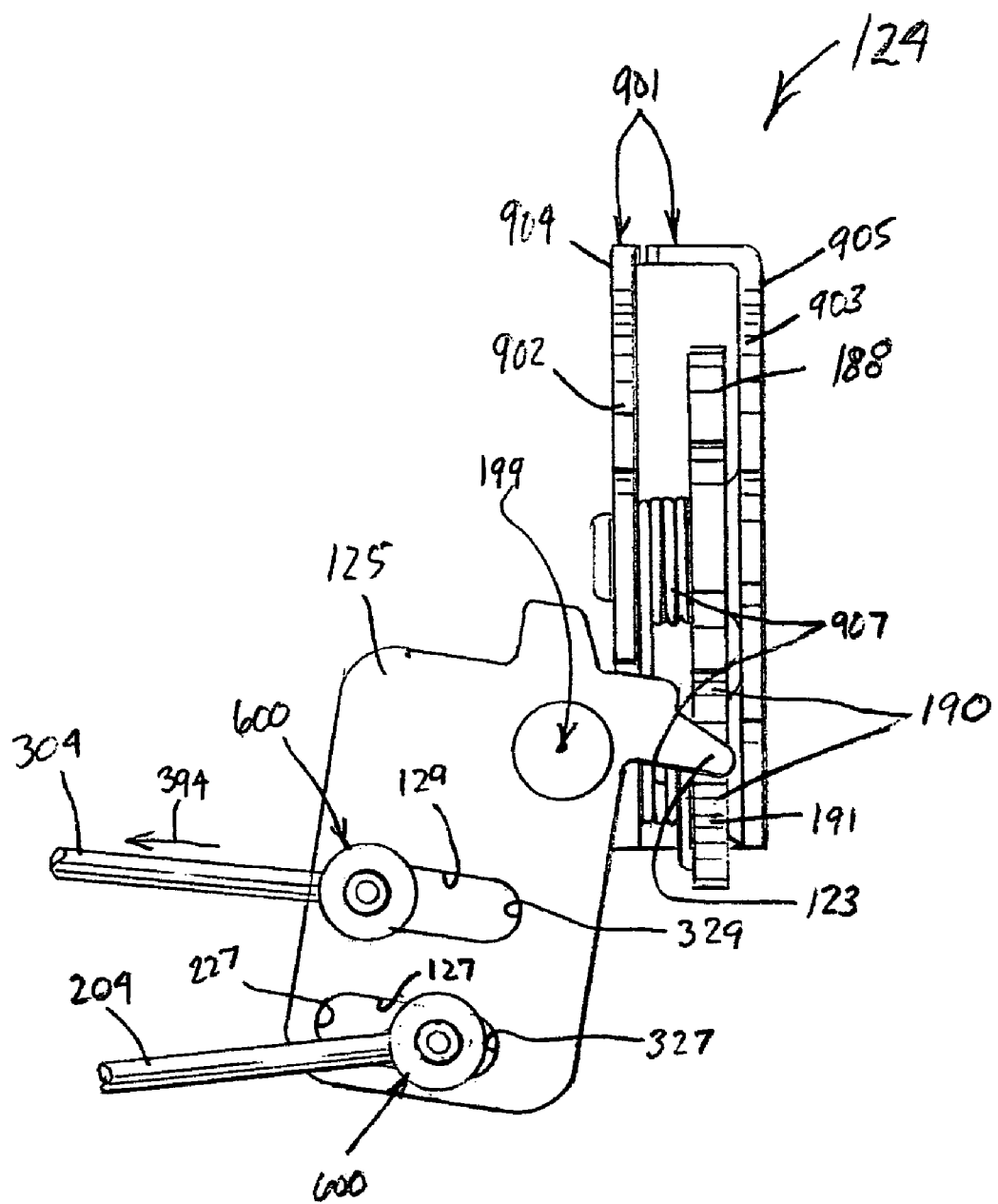
Figure 15:
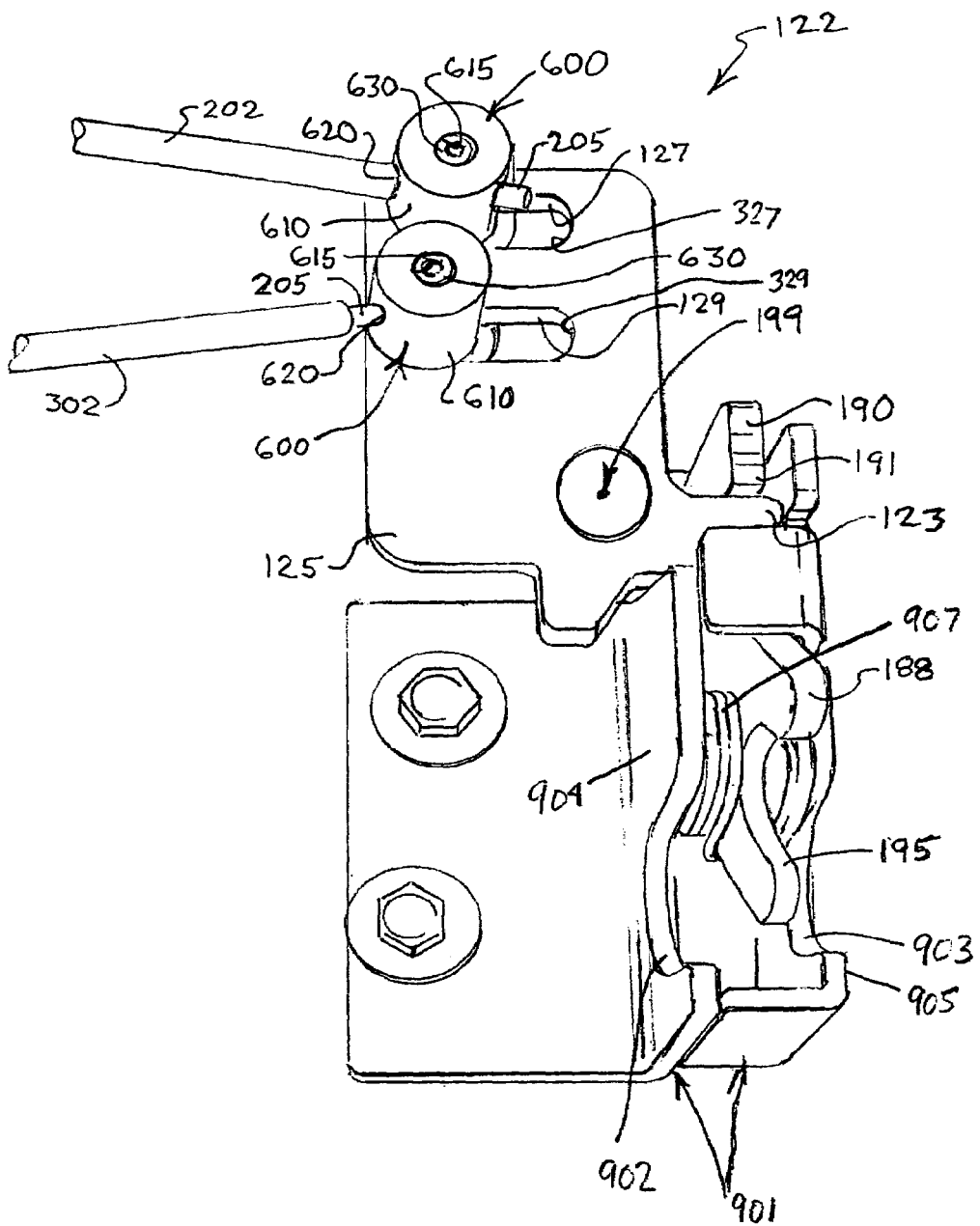
Figure 16:
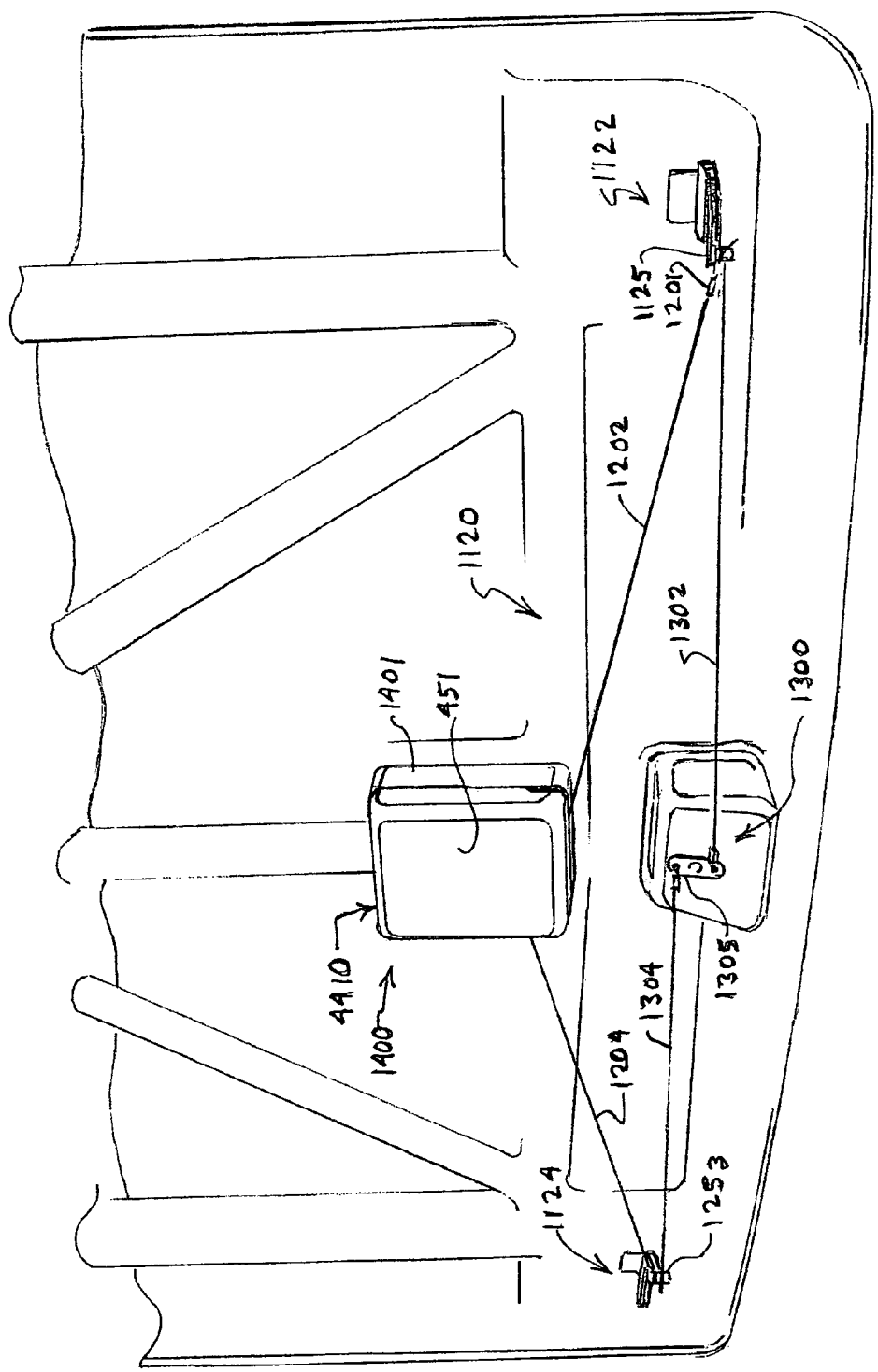
Figure 17:
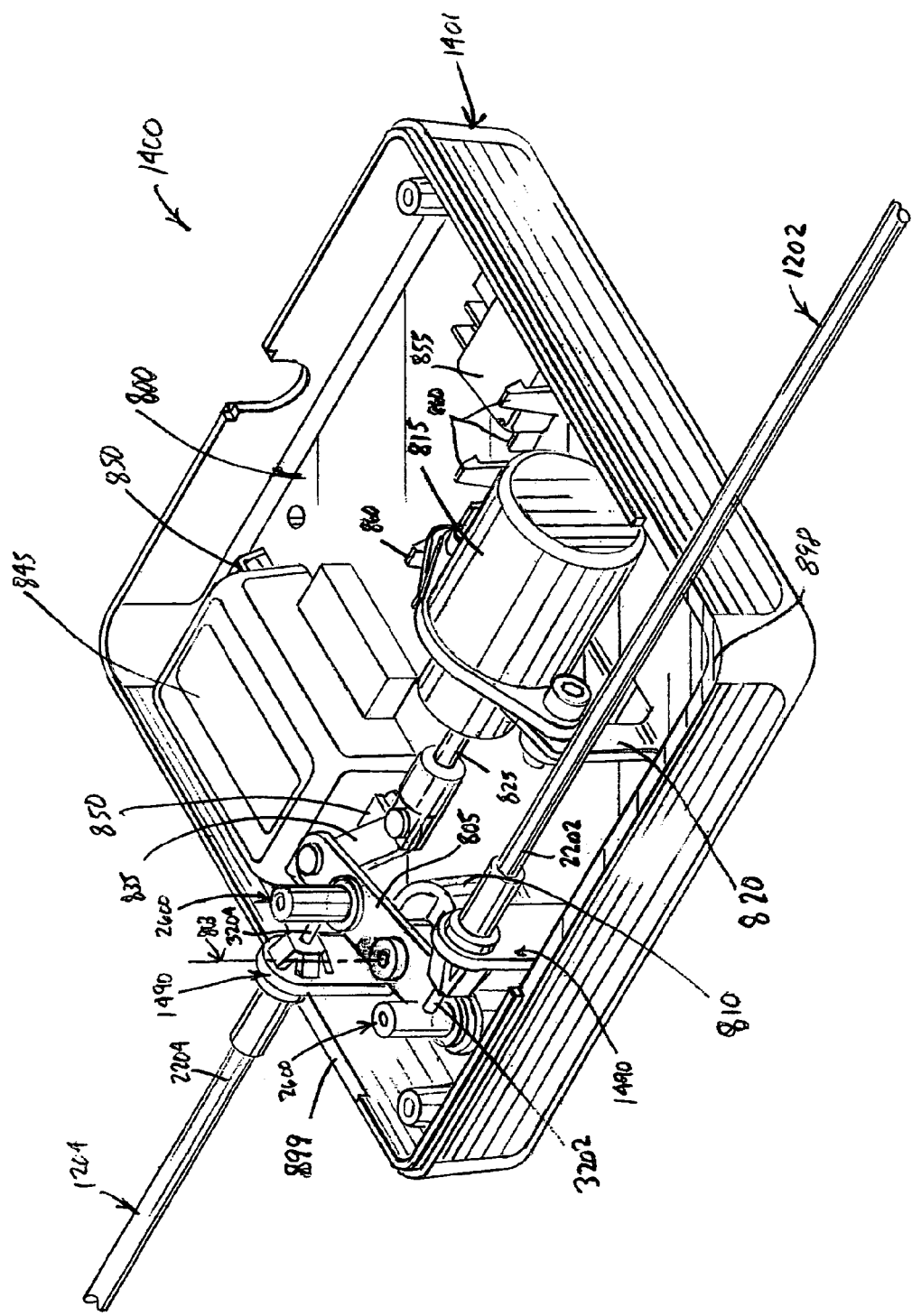
Figure 18:
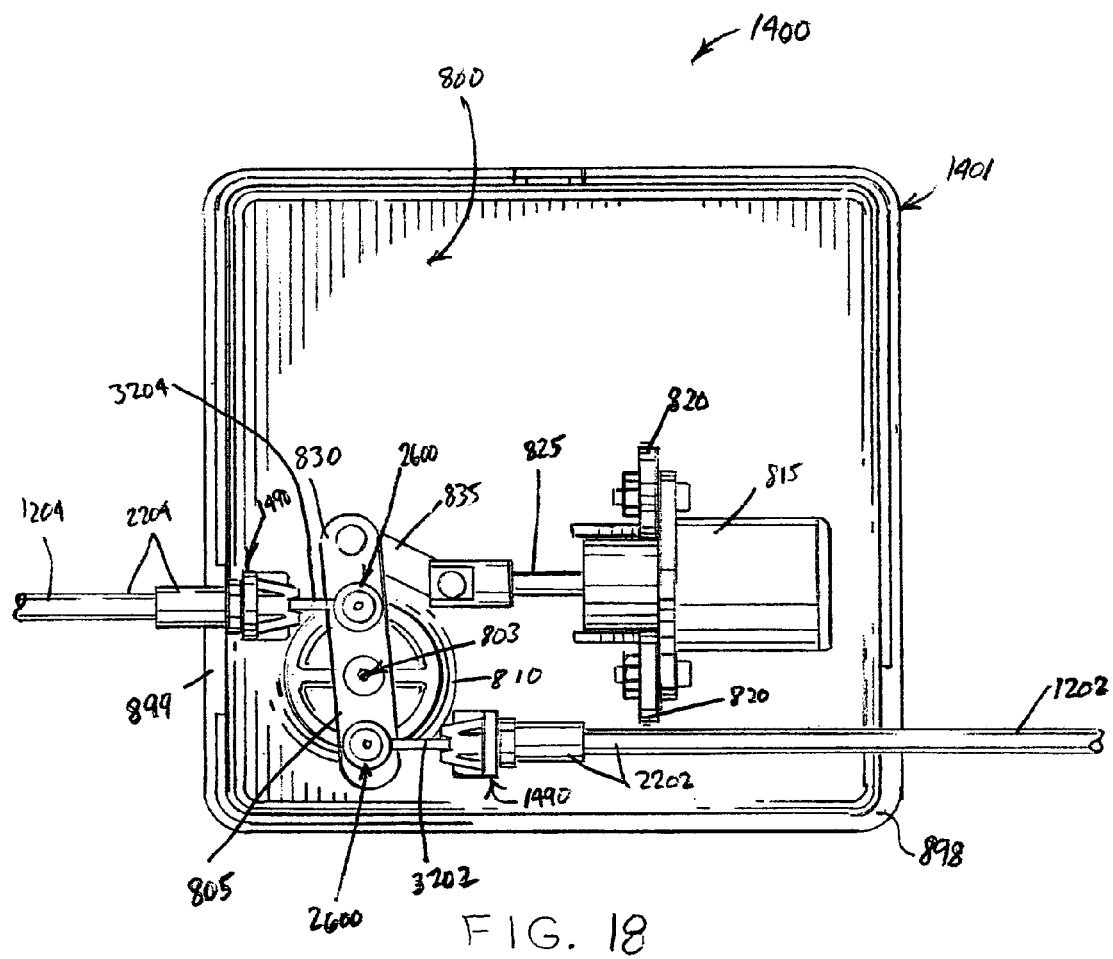
Figure 19:
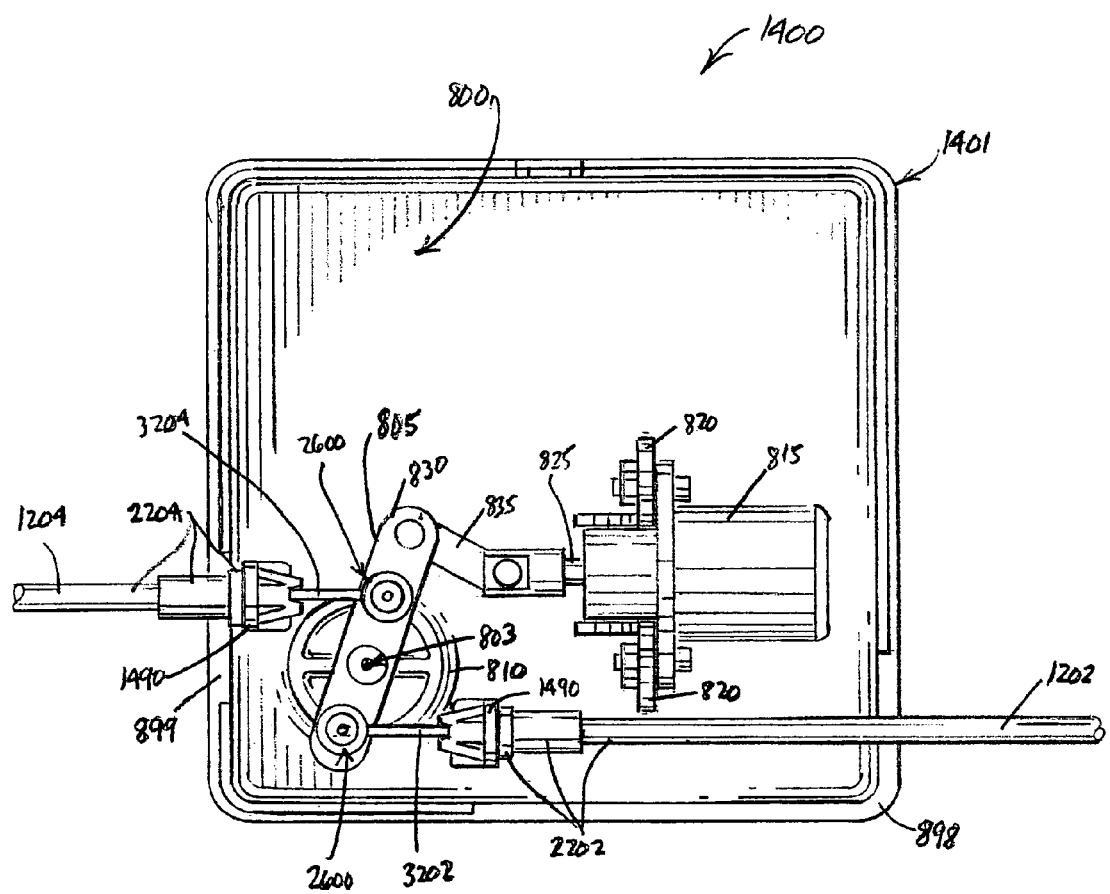
Figure 20:
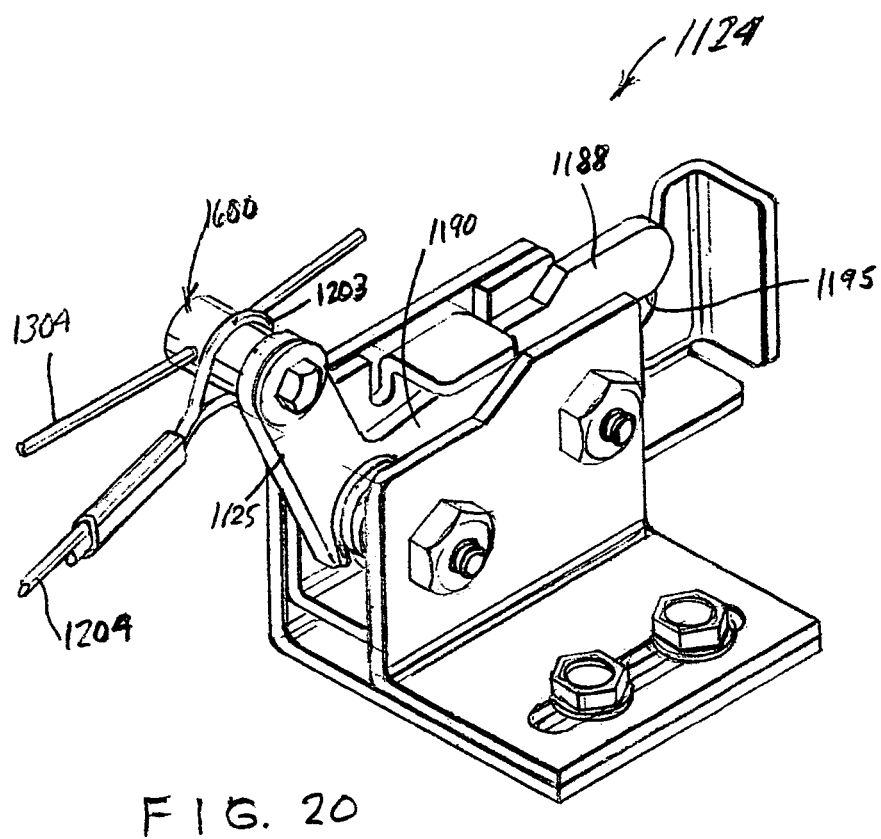
Figure 21:
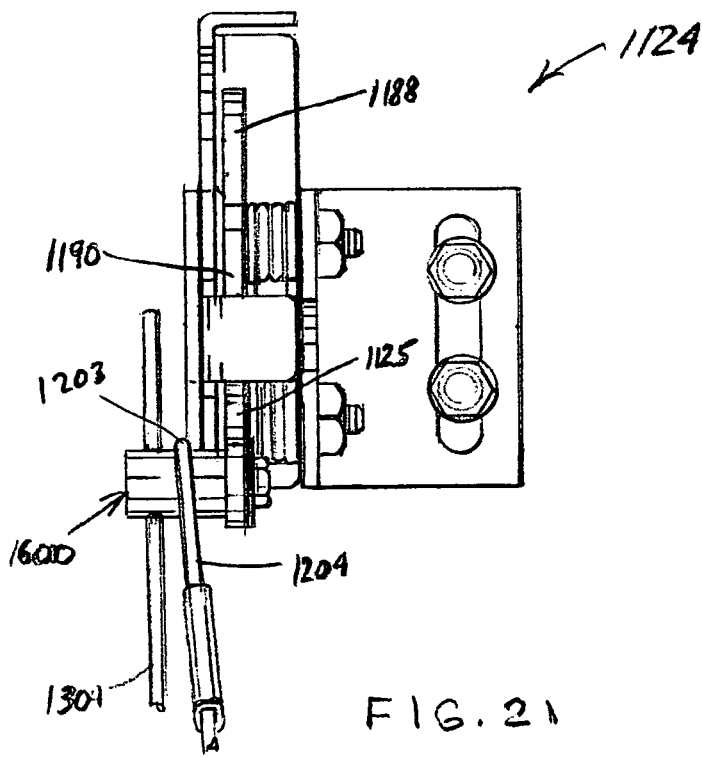
Figure 22:
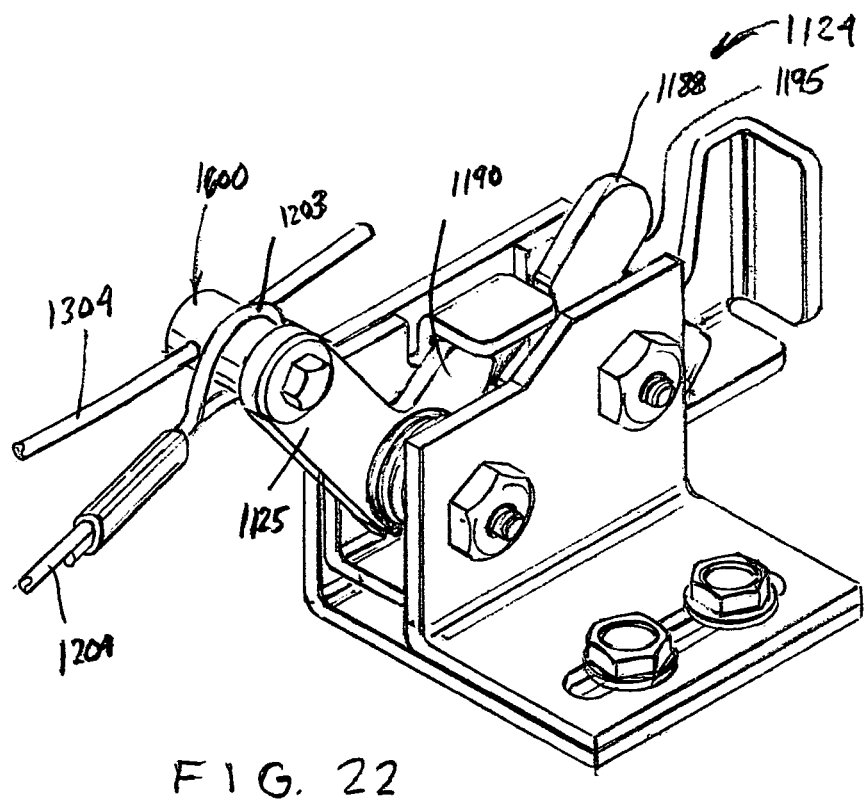
Figure 23:
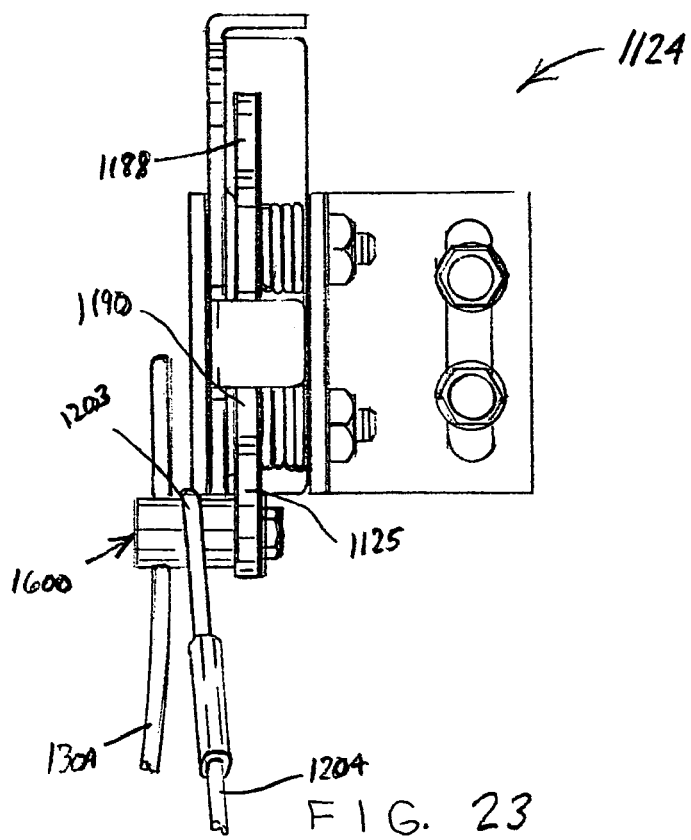
Figure 24:
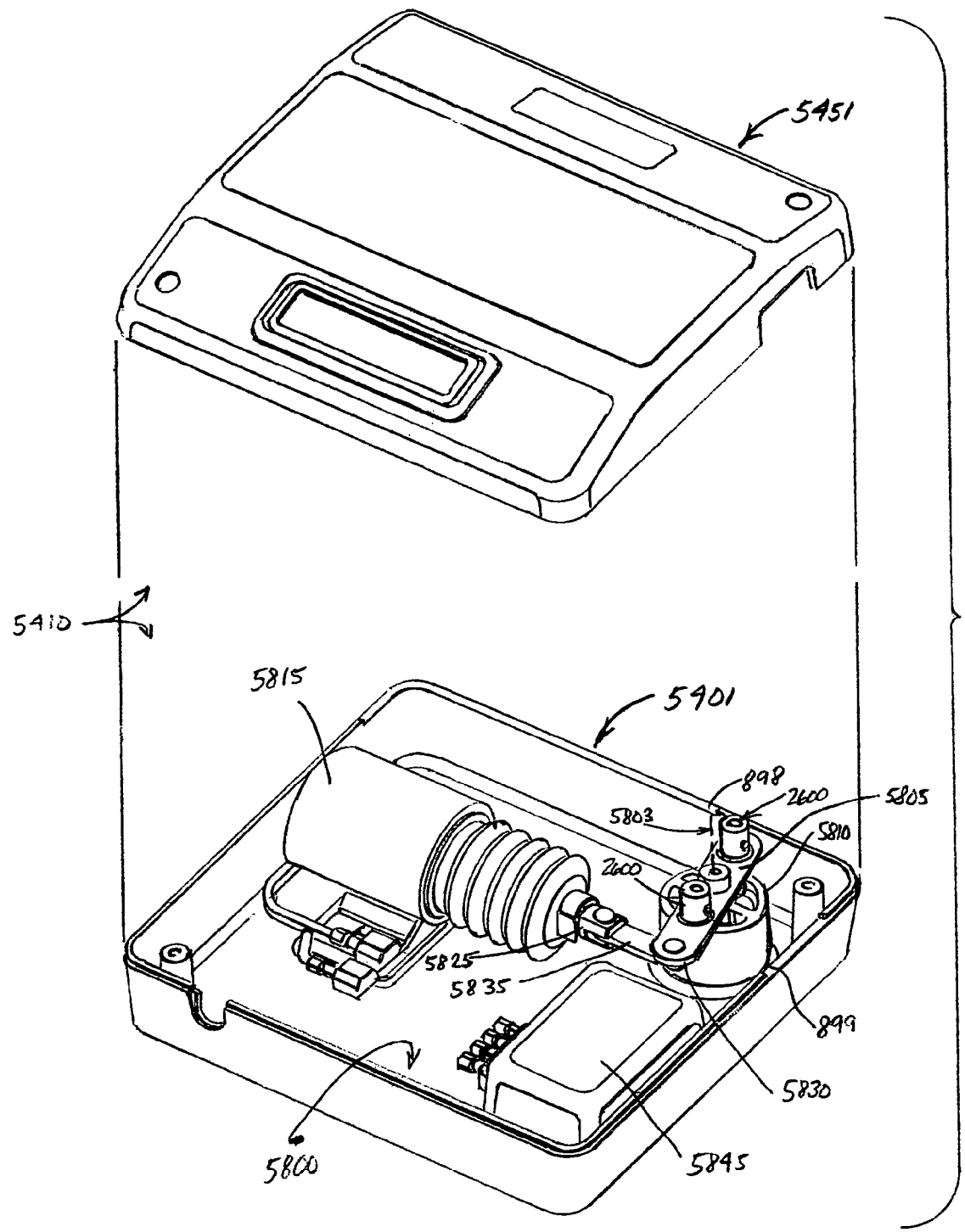
Figure 25:
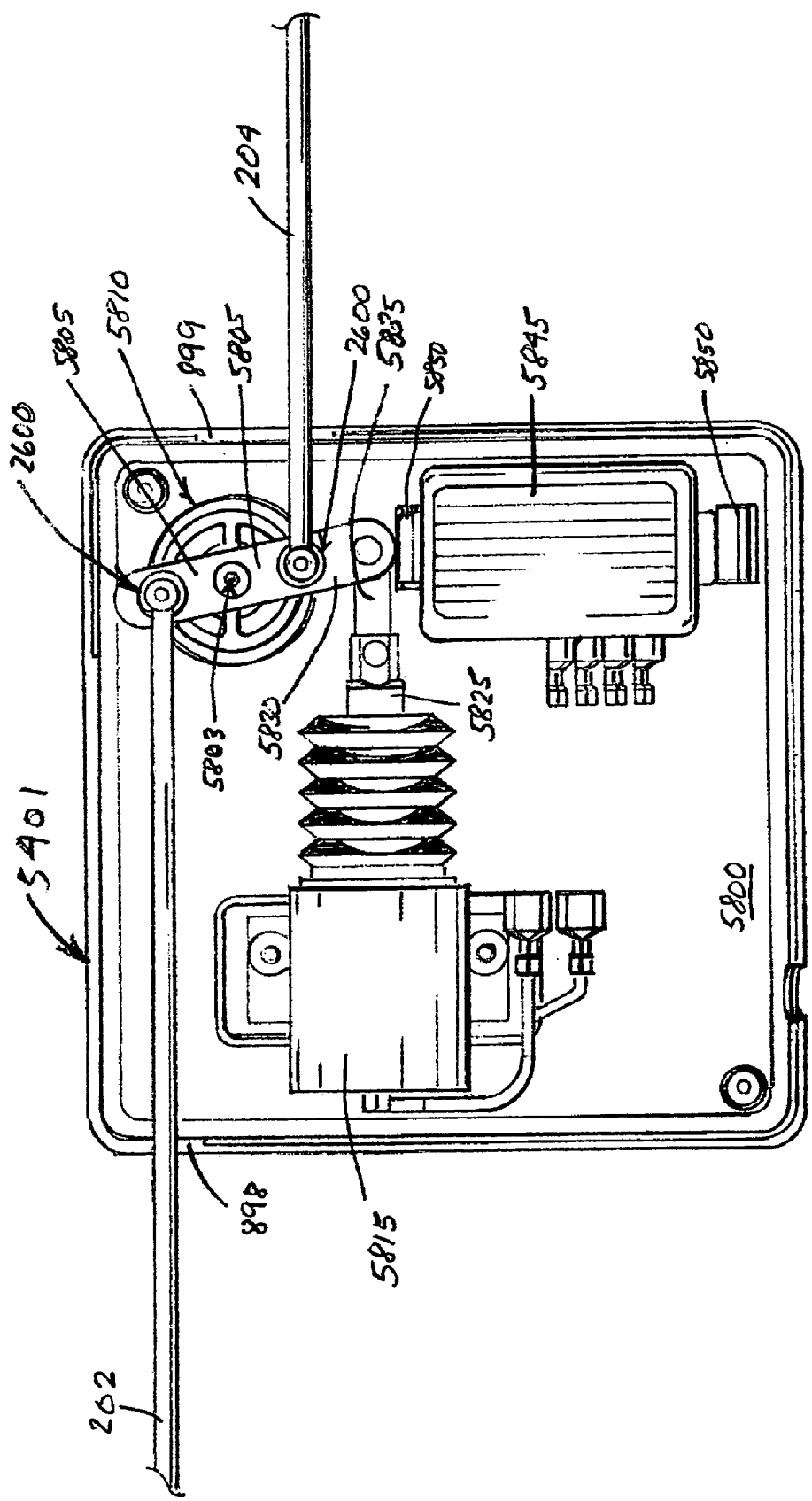

FIG. 8 is a top plan view of selected components of the control unit base assembly shown in FIG. 7, with the crank arm, the links and solenoid armature all being in their normal, non-operated positions;

FIG. 9 is a top plan view similar to FIG. 8 but showing the crank arm, the links and solenoid armature armature moved to their operated positions wherein the rightwardly extending link has moved leftwardly, and wherein the leftwardly extending link has moved rightwardly;

FIG. 10 is a perspective view of the right rotary latch assembly that also is depicted in FIGS. 1 and 2, with end regions of first and second links that are connected to a pivotal operating arm of the latch assembly depicted in their normal, non-operated positions, and with the pivotal operating arm of the latch assembly also depicted in its normal, non-operated position;

FIG. 11 is a top plan view thereof;

FIG. 12 is a top plan view similar to FIG. 11 but showing an initial movement of a first of the links that connect to the pivotal operating arm of the latch assembly, with this initial movement of the first link not being transmitted to the pivotal operating arm or to the second link, hence the pivotal operating arm and the second link remain in their normal, non-operated positions;

FIG. 13 is a top plan view similar to FIG. 12 but showing full movement of the first link to its operated position which causes the operating arm to pivot to effect unlatching of the latch assembly, it being noted that the movements of the first link and the operating arm have not been transmitted to the second link, hence the second link remains in its normal, non-operated position;

FIG. 14 is a top plan view similar to FIG. 11 but showing full movement of the second link to its operating position which causes the operating arm to pivot to effect unlatching of the latch assembly, it being noted that the movements of the second link and the operating arm have not been transmitted to the first link, hence the first link remains in its normal, non-operated position;

FIG. 15 is a perspective view on an enlarged scale of another of the latch assemblies depicted in FIGS. 1 and 2;

FIG. 16 is a perspective view of an alternate type of latching system utilizing flexible cable links installed on a tonneau cover;

FIG. 17 is a perspective view similar to FIG. 7 of an alternate embodiment of control box base assembly wherein the rigid rightwardly and leftwardly extending links shown in FIG. 7 have been replaced by flexible cable links that have protective tubular enclosures within which the flexible cables can translate, with end regions of the flexible cables being connected to the crank arm of the control box base assembly, with end regions of the protective tubular enclosures of the flexible cable links being connected to upstanding brackets supported by the control box base, and with the crank arm, the flexible cable links and the solenoid armature all being in their normal non-operated positions;

FIG. 18 is a top plan view of selected components of the control unit base assembly shown in FIG. 17, with the crank arm and the links and solenoid armature all being in their normal, non-operated positions;

FIG. 19 is a top plan view similar to FIG. 118 but showing the crank arm and the links and solenoid armature moved to their operated positions wherein the rightwardly extending link has moved leftwardly, and wherein the leftwardly extending link has moved rightwardly;

FIG. 20 is a perspective view of one of the latch assemblies shown in FIG. 16;

FIG. 21 is a top plan view thereof;

FIG. 22 is a perspective view similar to FIG. 21 but with one of the flexible cables being pulled to pivot the operating arm to its actuated position wherein it releases the pivotal latch bolt to move to the depicted unlatched position;

FIG. 23 is a top plan view thereof;

FIG. 24 is an exploded perspective view of an alternate form of control unit that can be substituted for the control unit shown in FIG. 2, with the lid or cover of the unit raised away from the base of the unit to permit interior components to be viewed; and FIG. 25 is a top plan view of the alternate control unit of FIG. 24 with the lid or cover thereof removed, and with a pair of opposed links connected to the control unit for being oppositely moved by the control unit.

DESCRIPTION OF INVENTION
EMBODIMENTS

Referring to FIGS. 1 and 2, a closure such as a tonneau cover of a pickup truck, or a cover or lid of a sizable tool box or storage container is indicated by the numeral 100. The closure, cover or lid 100 typically is connected by hinges (not shown) to an underlying structure such as the bed of a pickup truck or the base of a tool box or storage container, indicated by the numeral 102 in FIG. 1, for moving between a closed position (not shown) and an open position (depicted in FIG. 1) that provides access to an interior compartment defined by the bed or base 102 of the pickup truck, tool box or storage container, as indicated in FIG. 1 by the numeral 104.

Referring still to FIGS. 1 and 2, a linkage operated latching system 120 is connected to the closure, cover or lid 100, and includes left and right latch assemblies 122, 124 that are configured to receive and to releasably retain left and right strikers 132, 134 that are carried either by left and right portions of the base 102, as indicated by the numerals 112, 114 in FIG. 1, or by left and right rails 142, 144 that extend along opposite sides of the base as is depicted in FIG. 2. In FIG. 1, the latch assemblies 122, 124 are shown disengaged from the strikers 132, 134. In FIG. 2, the latch assemblies 122, 124 are shown in latched engagement with the strikers 132, 134.

To operate or unlatch the latch assemblies 122, 124 from the strikers 132, 134 in response signals from a pocket size, push button actuated, remote signal transmitter such as is indicated by the numeral 900 in FIG. 2, a first set of rigid links 202, 204 may extend from pivotal operating arms 125 of the latch assemblies 122, 124 to a control box 410 of a remote signal responsive operating mechanism 400. To operate or unlatch the latch assemblies 122, 124 in a more conventional manually actuated manner, a second set of rigid links 302, 304 extend from the pivotal operating arms 125 of the latch assemblies 122, 124 to the crank arm 305 of a manually actuated operating mechanism 300, inner elements of which are depicted in FIG. 2, and outer elements of which are depicted in FIG. 1.

To illustrate that features of the present invention are not limited to use with links that are rigid, an alternate form of latching system 1120 is depicted in FIG. 16. The latching system 1120 employs left and right latch assemblies 1122, 1124 that are connected by flexible cable links 1202, 1204 to a control box 4410 of a remote signal responsive operating mechanism 1400, and by flexible cable links 1302, 1304 to the crank arm 1305 of a manually actuated operating mechanism 1300. The depicted latch assemblies 1122, 1124 may be identical to such latch assemblies as are indicated by numerals 410, 510 in the drawings of Latch, Lock and Hinge System U.S. Pat. No. 6,427,500, the disclosure of which is incorporated herein by reference. Because features of the invention are in no way limited to use with any particular type of manually actuated operating mechanism, a very simple type of operating mechanism 300 will be described, and the operating mechanism 1300 will be said to have features that are identical to those of the operating mechanism 300.

The manually actuated operating mechanisms 300, 1300 each include a handle of the type that is indicated by the numeral 301 in FIG. 1. The handle 301 has a "T" shaped configuration and can be grasped at a location outside the cover 100 to pivot the crank arm 305 shown in FIG. 2 which is located inside the cover 100; or, in the case of the latching system 1200, the handle 301 will be understood to pivot the crank arm 1305 depicted in FIG. 16. When the crank arm 305 is pivoted about an axis that is indicated in FIG. 2 by the numeral 303, the pivoting of the crank arm 305 serves to pull the rigid links 302, 304 generally toward each other to operate or unlatch the left and right latch assemblies 122, 124; or, alternatively, the pivoting of the crank arm 305 may be used to push the links 302, 304 generally away from each other in applications wherein pushing movements, not pulling movements, are required to operate other forms of commercially available latch assemblies (not shown) that may be connected to the links 302, 304 in place of the depicted rotary latch assemblies 122, 124. When the crank arm 1305 of FIG. 16 is pivoted in a similar manner as described just above, the pivoting of the crank arm 1305 serves to pull the flexible cable links 1302, 1304 generally toward each other to operate or unlatch the left and right latch assemblies 1122, 1124.

Control boxes that respond to signals from a remote signal transmitter 900 or the like for oppositely moving the rigid links 202, 204 (one or both of which are depicted in FIGS. 1–15 and 25) or the flexible links 1202, 1204 (one or both of which are depicted in FIGS. 16–23) to operate or unlatch a pair of latches (for example the rotary latch assemblies 122, 124 depicted in FIGS. 1, 2 and 10–15, or the rotary latch assemblies 1122, 1124 depicted in FIGS. 16 and 20–23, or other types of latch assemblies) may take a variety of forms. These control boxes preferably are comprised of a base assembly and a lid or cover.

Examples of preferred base assembly configurations are 1) the base assembly 401 depicted in FIGS. 1–9 (selected internal components of which are depicted in FIGS. 2 and 7–9), 2) the base assembly 1401 depicted in FIGS. 16–19 (selected internal components of which are depicted in FIGS. 17–19, and 3) the base assembly 5401 depicted in FIGS. 24–25 (selected internal components of which are depicted in FIGS. 24–25). Examples of preferred lid or cover configurations are 1) the plain cover 451 depicted in FIGS. 1, 3 and 4, 2) the light-carrying lid or cover 1451 cover depicted in FIG. 5, 3) the light-carrying lid or cover 2451 depicted in FIG. 6, and 4) the light-carrying lid or cover 5451 depicted in FIG. 24. By combining various ones of the lids or covers 451, 1451, 2451, 5451 with one or the other of the base assemblies 401, 1401, control boxes having a variety of forms may be provided.

The base assembly 5401 depicted in FIGS. 24–25 differs from the base assembly 401 depicted in FIGS. 1–9 principally in that the base assembly 5401 is of larger size than the base assembly 401 and therefore provides more mounting space so that larger mechanical components (such as a larger, more powerful solenoid 5815) can be used to provide a heavier duty control unit that will more forcefully operate latch operating links connected to it. In FIG. 25, the links 202, 204 are shown connected to the base assembly 5401 in a manner that will permit the heavier duty base assembly 5401 to be directly substituted into the system depicted in FIG. 2 in place of the base assembly 401.

Because the base assembly 5401 has operating components that correspond to (i.e., serve the same purpose as) the operating components of the base assembly 401, the operating components that are depicted in FIGS. 24 and 25 are designated by reference numerals that correspond to the reference numerals that are used to designate corresponding components of the base assembly 401—numerals that are the same as the numerals used with the operating components of the base assembly 401, but that have the value "5000" added thereto. Thus, it will be understood that the solenoid 5815 of the base assembly 5401 corresponds to (i.e., serves the same function as) the solenoid 815 of the base assembly 401; the crank arm 5805 of the base assembly 5401 corresponds to the crank arm 805 of the base assembly 401; and other correspondingly numbered components of the base assembly 5401 correspond to correspondingly numbered components of the base assembly 401. Inasmuch as the correspondingly numbered components of the base assemblies 401, 5401 perform substantially the same functions in substantially the same ways, the discussion that follows relating to the operation of the components of the base assembly 401 also is pertinent to the operation of corresponding components of the base assembly 5401.

Whereas the first form of control unit 410 (depicted in FIGS. 1, 3 and 4) has no light assembly mounted on its relatively plain cover 451, the second form of control box 1410 (depicted in FIG. 5) has a relatively simple form of commercially available light assembly 1453 mounted on its cover 1451 for illuminating the interior of the compartment 104 of FIG. 1.

The third form of control box 2410 (depicted in FIG. 6) has a more complex form of commercially available light assembly 2453 mounted on its cover 2451, and is provided with an on-off switch 2455 to control when the light assembly 2453 illuminates the interior of the compartment 104 of FIG. 1.

Figure 3:
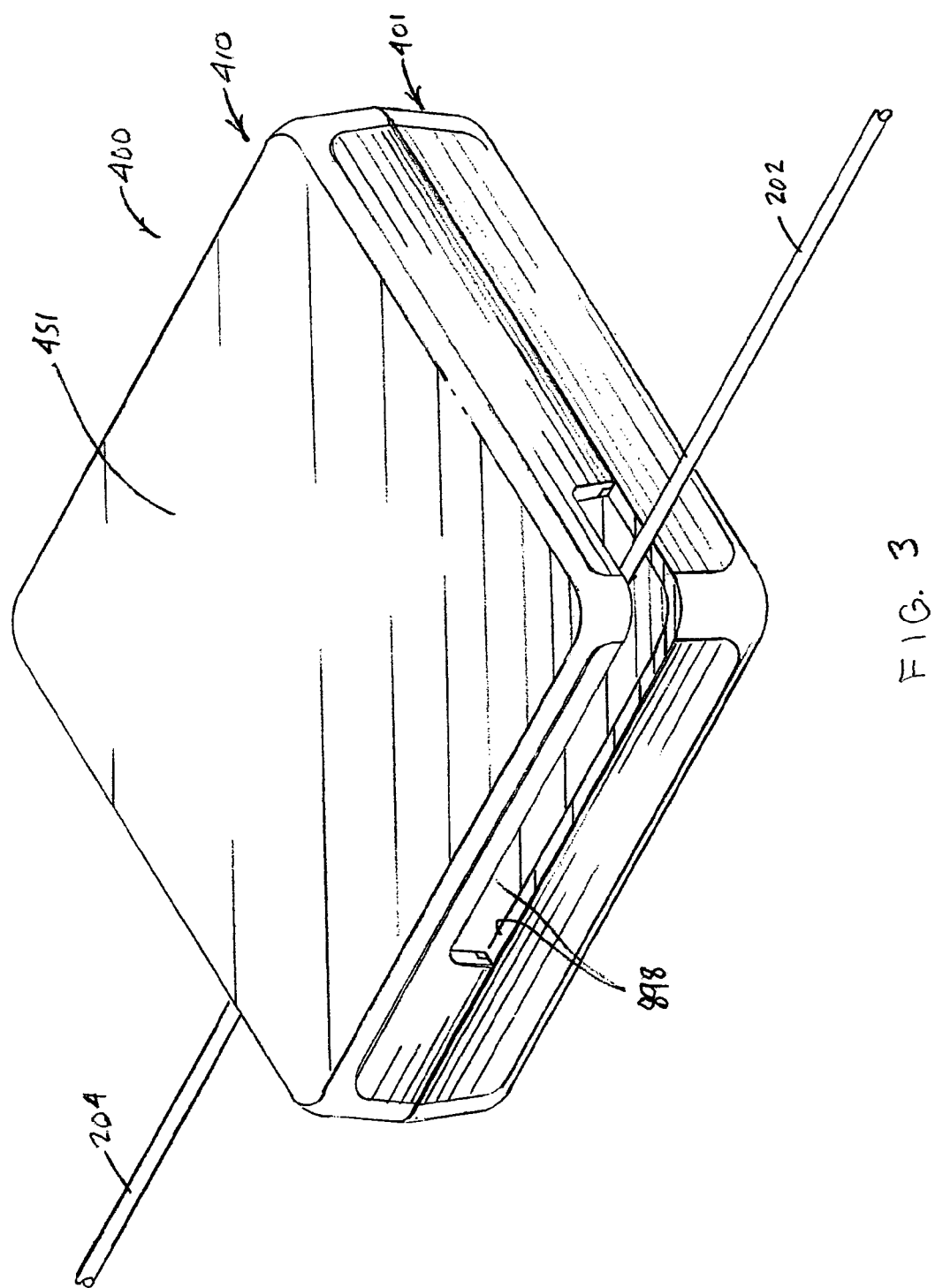
FIG. 3 is a perspective view of the housing of the control box of FIG. 1, with the view showing principally top, front and right side portions of the assembled cover and base of the housing, and with rigid links extending from opposite sides thereof.
Figure 4:
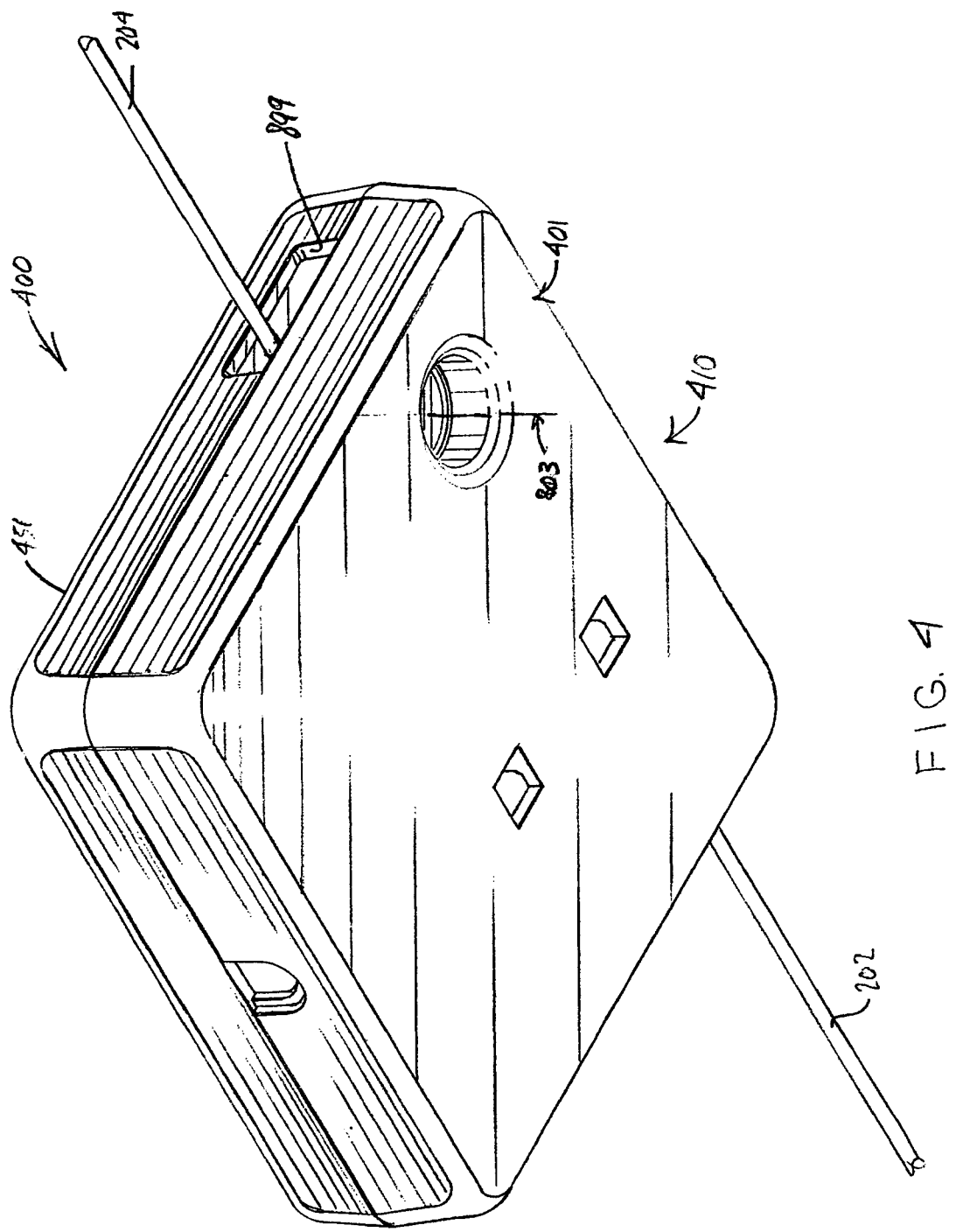
FIG. 4 is a perspective view of the assembled cover and base of the housing of the control box of FIGS. 1 and 3, with the view showing principally bottom, rear and left side portions thereof, and with rigid links extending from opposite sides thereof.
Figure 5:
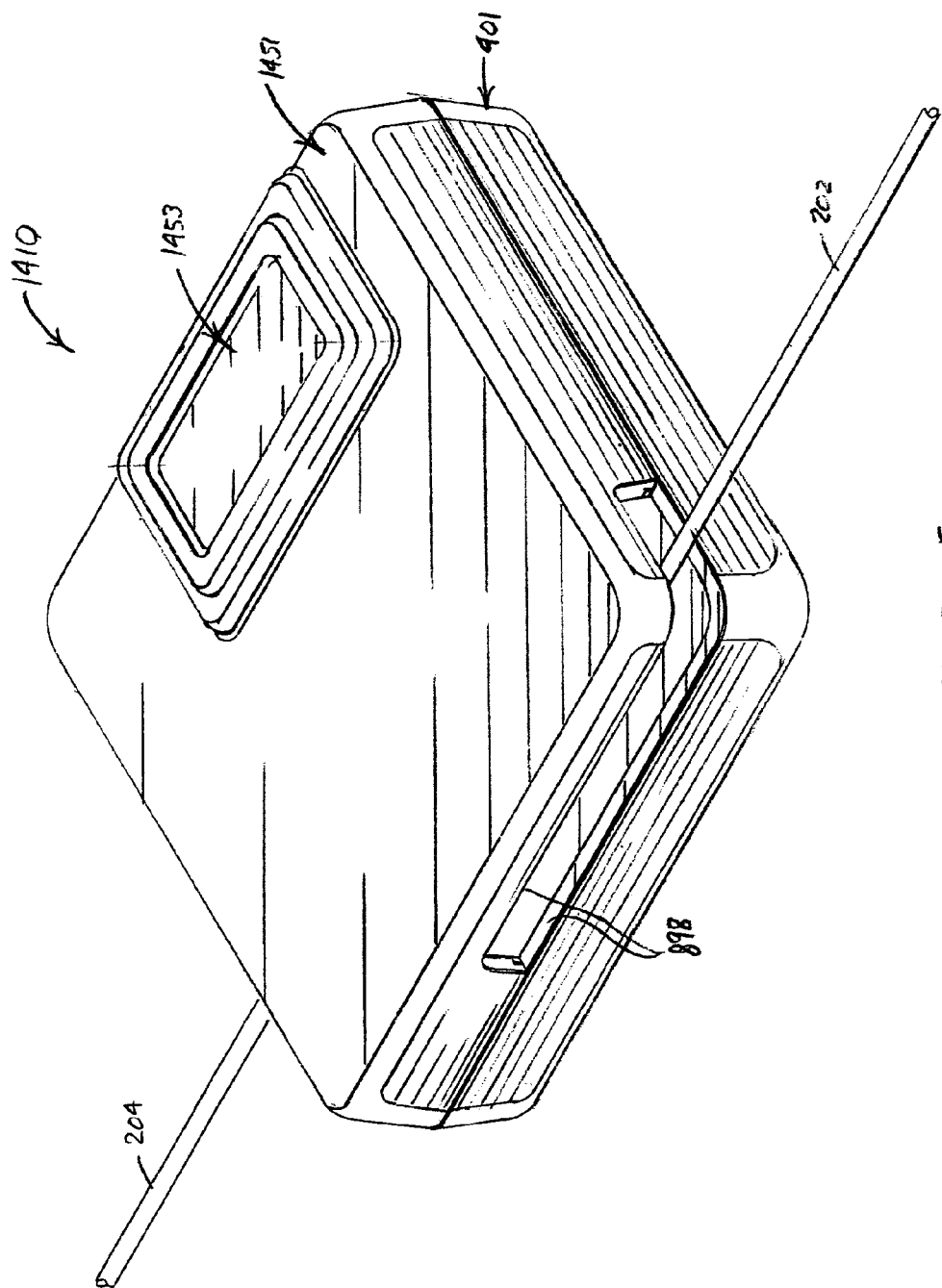
FIG. 5 is a perspective view of a control box assembled by utilizing the base assembly that is depicted in FIGS. 2 and 7–9 with an alternate form of cover that carries a commercially available light assembly for illuminating the interior of the bed of the pickup truck or the interior of the tool box or storage container, or that is assembled utilizing the base assembly that is depicted in FIGS. 15–17 with the light assembly carrying cover.
Figure 6:
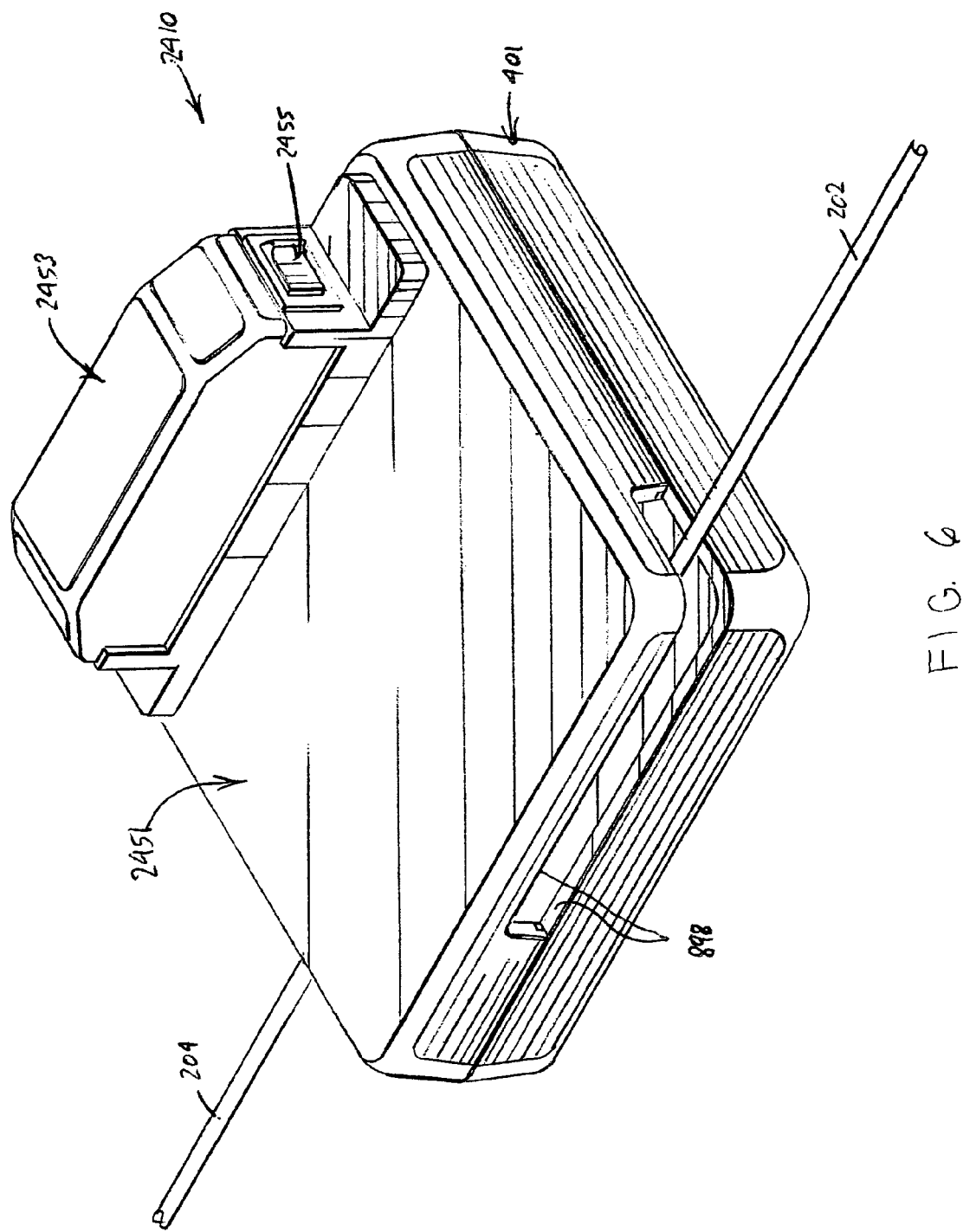
FIG. 6 is a perspective view of a control box assembled by utilizing the base assembly that is depicted in FIGS. 2 and 7–9 with still another form of cover that carries a more complexly configured commercially available light assembly that provides an off-on switch, or that is assembled utilizing the base assembly that is depicted in FIGS. 15–17 with the cover that carries the complexly configured light assembly that has an off-on switch.

A fourth form of control box 4410 is depicted in FIG. 16: it employs the base assembly 1401 of FIGS. 17–19 and the plain cover 451 that also is shown in FIG. 3. Fifth and sixth types of control boxes (not shown) may be provided by utilizing the base assembly 1401 of FIGS. 15–17 in combination with one or the other of the light assembly carrying covers 1451, 2451 shown in FIGS. 5 and 6, respectively.

The seventh form of control box 5410 (depicted in FIG. 24) employs the base assembly 5401 of FIGS. 24 and 25, and the light-assembly carrying cover 5451 of FIG. 24.

As is seen in FIGS. 3–6 and 24, link receiving openings 898, 899 are defined by the pan-shaped upwardly opening bases and covers of control units that are defined by various combinations of the base assemblies 401, 1401, 5401 and the covers 451, 1451, 2451, 5451. The openings 898, 899 preferably are defined by cooperative formations of the various bases and their associated covers along lines of juncture of the bases and covers. The openings 898, 899 (especially the opening 898) are of relatively large size so as to permit the control boxes of the present invention to be used with widely different arrays of links—arrays that need not employ links 202, 204 that extend essentially in opposite directions (e.g., right angle arrays of links 202, 204 and other linkage arrangements that employ links that extend in still other types of angular relationships are equally workable).

In order to connect end regions of the rigid links 202, 204, 302, 304 to the rotary latch assemblies 122, 124, generally cylindrical connectors 600 are used that are of a type best seen in FIG. 15 wherein the left latch assembly 122 is depicted, and in FIG. 10 wherein the right latch assembly 124 is depicted. The connectors 600 each have a generally cylindrical body 610. A threaded, axially extending passage 615 opens through one end of the body 610, and intersects with a diametrically extending passage 620 that opens through opposite sides of the body 610. A link end region 205 extends through the diametrically extending passage 620. A set screw 630 is threaded into the axially extending passage 615 and has its inner end region tightened into engagement with the link end region 205 to retain the link end region 205 within the diametrically extending passage 620. By this arrangement, end regions of the links 202, 204, 302, 304 are rigidly connected to separate ones of the generally cylindrical connectors 600.

Referring to FIGS. 15 and 10, elongate slots 127, 129 are formed through the operating arms 125 of the left and right latch assemblies 122, 124 to receive lower end regions (not shown) of the connectors 600 in a slip fit that permits the connectors 600 to move back and forth along the lengths of the slots 127, 129 for distances that are limited by the lengths of the slots 127, 129. Because the slots 127, 129 align, at least to a significant extent, with the rigid rod-like links 202, 204, 302, 304; because the rod-like links are pulled by the operating mechanisms 300, 400 along paths of travel that parallel the lengths of the rod-like links (with typical ones of these paths of travel being indicated in FIGS. 12 and 13 by the arrow 294, and in FIG. 14 by the arrow 394); and because the rod-like links are coupled by the connectors 600 (which, in essence, comprise what can be referred to as "end formations" of the rod-like links to which each of the end connectors 600 is attached) to the latch operating arms 125 by being slidably received within the slots 127, 129, it will be seen that the slot-received connectors 600 establish what will be recognized by those who are skilled in the art as "lost motion connections" between the links 202, 204, 302, 304 and the latch operating arms 125—i.e., connections that permit relative movement to take place between the operating arms 125 and the rod-like links that are coupled by the connectors 600 and by the slots 127, 129 to the operating arms 125.

In FIGS. 10–14, the right latch assembly 124 of FIGS. 1 and 2 is depicted. In FIG. 15, the left latch assembly 122 of FIGS. 1 and 2 is depicted. The latch assemblies 122, 124 are mirror image reversals of each other. Each of the latch assemblies 122, 124 has a housing 901 with parallel-extending sides 904, 905 that define aligned U-shaped notches 902, 903 that are configured to receive cylindrical portions of the strikers 112, 114 depicted in FIG. 1. Each of the latch assemblies 122, 124 has a rotary latch bolt 188 that defines a U-shaped notch 195, and that is pivotal between an latched position (FIGS. 10–12) and a latched position (FIGS. 13–15); a rotary pawl 190 that is pivotal between a retention position (FIGS. 10–12) and a release position (FIGS. 13–15); a biasing means or torsion coil spring 907 that biases the latch bolt 188 away from its latched position toward its unlatched position, and that biases the pawl 190 away from its release position toward its retention position; and an operating arm 125 that can pivot relative to the housing 901 between a non-operated position (FIGS. 10–12 and 15) and an operated position (FIGS. 13–14).

In FIG. 10, the right latch assembly 124 is shown with its rotary or pivotal latch bolt 188 in the "latched" position that is assumed by the bolt 188 when the bolt 188 is latched into engagement with the right striker 134, as shown in FIG. 2; and, in FIG. 10, a rotary pawl 190 of the latch assembly 124 is in its retention position wherein it engages the rotary latch bolt 188 (this engagement is not as well shown in the accompanying drawings as it is disclosed in the referenced Rotary Latch Patents wherein the design, operation and features of rotary latches such as those indicated by the numerals 122, 124, 1122, 1124 are disclosed, which disclosures are incorporated herein by reference) to retain the rotary latch bolt 188 in its latched position until the pawl 124 is pivoted out of retaining engagement with the latch bolt 188 to its release position wherein the rotary pawl 190 permits the rotary latch bolt 188 to pivot to its unlatched position, as depicted in FIG. 15.

In FIG. 10, the link 204 has its connector 600 positioned a short distance from a left end 227 of the slot 127, and a much greater distance from the right end 337 of the slot 127; and, the link 304 has its connector 600 positioned adjacent the left end 229 (shown in FIG. 13) of the slot 129, and as far as possible from the right end 339 of the slot 129.

What is shown in FIG. 10 is the latched position of the rotary latch bolt 188; the retention position of the pawl 190; and the non-operated positions of the operating arm 125, the links 204, 304, and the connectors 600 that couple the links 204, 304 to the operating arm 125—i.e., the normal positions that are assumed by all of these components when the latch assembly 124 is in its latched position and neither of the operating mechanisms 300, 400 are being operated to move the links 302, 202 to unlatch the latch assembly 124.

What is shown in FIG. 11 are the same components as are depicted in FIG. 10, in the same positions that are illustrated in FIG. 10, with a portion of the housing of the latch assembly 124 removed so that a rightwardly extending formation 123 of the operating arm 125 can be seen where it engages an upwardly extending portion 191 of the pawl 190 of the latch assembly 125. If the operating arm 125 is pivoted about an axis 124 from the non-operated position shown in FIG. 10 to the operated position shown in either of FIGS. 13 and 14, the rightwardly extending formation 123 engages and pivots the upwardly extending portion 191 of the pawl 190 to release the pawl 190 from the retaining position wherein the pawl 190 retains the latch bolt 188 in its latched position, which permits the latch bolt 188 to pivot to its unlatched position (best seen in FIG. 15) wherein a U-shaped recess 195 (FIGS. 10 and 15) of the latch bolt 188 opens toward the striker 134 (FIG. 1) to permit the cover 100 to be opened and closed. When the latch bolt 188 is in the unlatched position of FIG. 15, portions of the U-shaped notch 195 of the latch bolt 188 align with portions of the U-shaped notches 902, 903 defined by opposed sides 904, 905 of the housing 901 of the latch assembly 122 to permit a generally cylindrical portion of the striker 112 (shown in FIG. 1) to move into and out of the U-shaped notches 195, 902, 903 so the cover 100 (shown in FIG. 1) can be opened and closed. The rotary latch 124 functions in the same manner to latchingly receive cylindrical portions of the striker 114 (shown in FIG. 1) as the cover 100 is pivoted between open and closed positions.

What is shown in FIG. 12 is an initial movement of one of the links 204 that connects with the remote signal responsive operating mechanism 400—an initial movement that takes place when a solenoid of the operating mechanism 400 is energized, as will be explained shortly. This initial movement does not cause any corresponding movement of the latch operating arm 125 of the latch assembly 124 because, as is shown in FIG. 12, all that happens is that this initial movement of the link 204 causes the connector 600 that is connected to the link 204 to move to the left end region 227 of the slot 127. The fact that the link 204 has moved along a path of travel indicated by the arrow 294 without causing corresponding pivotal movement of the operating arm 125 is illustrative of one aspect of the "lost motion" that is permitted by the "lost motion connection" between the link 204 and the operating arm 125.

What happens during this initial movement of the link 204 is that the armature of the solenoid and such components as couple the solenoid armature to the link 204 are brought quickly up to speed so that these components which move concurrently develop a flywheel-like momentum that is useful a fraction of a second later when it is desired that the movement of the link 204 be transmitted to the operating arm 125 to cause pivotal movement of the operating arm 125 so as to unlatch the latch assembly 124. The link 204 moving in the direction of the arrow 294 gains momentum during the brief period of time that the lost-motion connection of the link 204 to the operating arm 125 permits the link 204 to move before the end connector 600 engages the end of the slot 127 (as depicted in FIG. 12) so as to cause pivotal movement of the operating arm 125 (as depicted in FIG. 13).

What is shown in FIG. 13 is that continued movement of the link 204 (leftward movement in the direction of the arrow 294 that takes place after the connector 600 reaches the left end 227 of the slot 127) causes pivotal unlatching movement of the operating arm 125 about an axis indicated by the numeral 199—which, in turn, causes the rotary pawl 190 to pivot to its operated or release position wherein it disengages the rotary latch bolt 188 so that the latch bolt 188 can pivot to its unlatched position (shown in FIGS. 10 and 13) to release the striker 134 (FIG. 1).

What also is shown in FIGS. 12 and 13 is that, when the link 204 executes the aforedescribed leftward movements, the link 304 that connects with the crank arm 305 of the manually actuated operating mechanism 300 does not move at all—due to the lost motion connection that is provided between the link 304 and the operating arm 125. In FIG. 12, it will be seen that the link 304 is in exactly the same "normal" position that is depicted in FIGS. 10 and 11. In FIG. 13, it will be seen that the lost-motion connection that is provided by the interaction of the slot 129 with one of the connectors 600 permits the link 304 to continue to remain in its "normal" position depicted in FIGS. 10 and 11 even during and after the link 204 has moved sufficiently to cause the operating arm 125 to pivot about the axis 199 to the operated position shown in FIG. 13.

What is shown in FIG. 14 is that the same sort of operating arm movement that is effected in FIG. 13 by the link 204 also (i.e., alternatively) can be effected by the link 304 when the link 304 is pulled leftwardly by the pivoting of the crank arm 305 of the manually actuated operating mechanism 300—and that neither the leftward movement of the link 304 and nor the pivotal unlatching movement of the operating arm 125 will cause corresponding leftward movement of the link 204 due to the presence of the lost-motion connection that is established by the interaction of the slot 127 and the connector 600 carried by the link 204. Thus, each of the links 204, 304 can be pulled to operate the right latch assembly 124 without causing any corresponding movement of the other of the links 204, 304; and, this same arrangement holds true with respect to the links 202, 302 and the operating arm 125 of the left latch assembly 122, which employs link and arm components that are configured as left-right mirror-image reversals of the link and arm components 204, 304 and the operating arm 125 of the right latch assembly 124.

Referring to FIGS. 16 and 20–23 wherein the rotary latch assemblies 1122, 1124 of the linkage assembly 1120 are depicted, it will be seen that the latch assemblies 1122, 1124 (which are left-right mirror image reversals of each other, just as are the left and right latch assemblies 122, 124) each employs a rotary latch bolt 1188 that is releasably retained in its latched position by a pawl 1190; and that the pawl 1190 also defines an operating formation 1125 to which the flexible links 1202, 1204, 1302, 1204 connect. While the links 1202, 1204 are connected to upwardly extending operating arm formations 1125 of the pawls 1190 by connectors 1600 that are much like the connectors 600, it will be seen that the links 1202, 1204 have looped end regions 1201, 1203 that simply wrap about the connectors 1600. The connectors 1600 are identical to the connectors 600 except that they do not slide in slots defined by operating arms but rather are connected firmly to the operating arm formations 1125 for movement therewith.

In FIGS. 20 and 21, a latched position for the latch bolt 1188, and a non-operated or retention position for the pawl 1190 and its operating arm formation 1125 are shown. In FIGS. 22 and 23, one or the other of the flexible cable links 1204, 1304 has been pulled to pivot the pawl 1190 and its operating arm formation 1125 to an operated position which causes the pawl to move to a release position wherein it releases the latch bolt 1188 which has pivoted to its unlatched position under the influence of a spring that forms a part of the latch assembly 1124. There is no lost motion connection provided by relatively slidable components associated with the rotary latches 1122, 1124, because the flexibility of the cable type links 1202, 1204, 1302, 1304 can offer a similar kind of performance, and because pulling on any one of the cables 1202, 1204, 1302, 1304 does not disturb others of the cables 1202, 1204, 1302, 1304 so as to cause unwanted movement of components to which the cables are connected.

Referring to FIGS. 2, 7, 24 and 25, the control box base assemblies 401, 5401 include generally rectangular pan-shaped bases 800, 5800 that preferably are formed from plastics material configured to provide upstanding, generally cylindrical mounts 810, 5810 for crank arms 805, 5805 that define axes 803, 5803 about which the crank arms 805, 5805 can pivot. Whereas the base assembly 401 provides an upstanding wall-like formation 820 for mounting an electrical solenoid 815, the base assembly 5401 has its solenoid 5815 connected to the floor of the pan-shaped base 5800. The solenoids 815, 5815 have armatures 825, 5825 that move linearly, and that are connected by links 835, 5835 to end regions 830, 5830 of the crank arms 805, 5805. Flexible mounts 850, 5850 (FIG. 25) are provided to assist with the snap-in-place mountings of radio signal receiver units 845, 5845 and other electrical or electronic circuitry components as may be needed, such as the relay 855 of the control unit or control box 410.

Referring to FIG. 2, it will be seen that interior regions of the control box 410 can be utilized to house wiring and circuitry components such as fuses 2900 and other elements that are employed to electrically interconnect the solenoid 815, the radio receiver unit 845, and the relay 855 so that power may be supplied from a wiring harness 2910 to operate the radio signal receiver unit 845, and so that power may be delivered to the relay 855 and to the solenoid 815 when the receiving unit 845 receives an appropriate radio signal to cause the armature 825 to move the link 835 to pivot the crank arm 805 to draw the links 202, 204 generally toward each other to operate the latches 122, 124 in the manner that has been described earlier herein. Similar provisions may be added to the control box 5410.

Referring to FIGS. 7 and 25, cylindrical connectors 2600 that closely resemble the earlier described cylindrical connectors 600, 1600 are employed to connect end regions of the rigid rod-like links 202, 204 to the crank arms 805, 5805 at locations equally spaced from and on opposite sides of the pivot axes 803, 5803 of the crank arms 805, 5805. Referring to FIGS. 7 and 8 wherein the non-operated positions of components of the control box 410 are shown, it will be seen that when the armature 825 of the solenoid 815 is in its normally extended position, and the crank arm 805 assumes nearly a twelve o'clock position. Referring to FIG. 9 wherein the operated positions of the components of the control box 410 are shown, it will be seen that when the armature 825 of the solenoid 815 has been retracted rightwardly in response to electrical energization of the solenoid 815, and that the crank arm 805 has been pivoted to nearly a one o'clock position to draw the links 202, 204 generally toward each other to operate the latch assemblies 122, 124. Components of the control box 5410 operate in a similar manner.

Referring to FIG. 17, it will be seen that the arrangement of the control box 1410 is very much the same as that of the control box 410, and that numerals that are employed in FIG. 7 to designate components of the control box 410 also are employed in FIG. 17 to designate exactly the same components that are utilized in the control box 1410. What differs about the control boxes 410 and 1410 is that the control box 1400 has added brackets 1490 that connect with and support tubular protective enclosures 2202, 2204 that house and protectively surround the flexible cables 3202, 3204 of the links 1202, 1204. The brackets 1490 to hold the tubular enclosures 2202, 2204 in place as the flexible cables 3202, 3204 translate within the enclosures 2202, 2204. The operation of the control boxes 410, 1410 is the same—it being seen that in FIGS. 17 and 18, the non-operated positions of components corresponds to what is shown in FIGS. 7 and 8, and that, in FIG. 19, the operated positions of components corresponds to what is shown in FIG. 9.

In preferred practice, the radio signal receiving unit 845 preferably is of a type designed to receive and respond to radio frequencies with the range of about 281 to about 321.9 MHz, is programmed to respond to a single randomly selected code that does not change, and serves to provide electrical power to the solenoid 815 when a correctly coded radio signal is received from the portable, pocket size, push button operated transmitter 900. Units of this type are commercially available from Iowa Export-Import, Des Moines, Iowa 50309 by specifying part or model number "MULTI-RCU7-IL."

A variety of additional, commercially available components and apparatus also may be employed in implementing features of the invention. For example, instead of supplying the control units with electrical power through a wiring harness such as is indicated by the numeral 2910 in FIG. 2, batteries (not shown) or low voltage transformers (not shown) may be utilized, with one or more solar panels (not shown) also being provided to assist in providing power, for example in the charging of batteries. Still other complementary or substitutable components and apparatus that may be used with the disclosed control boxes and or with the disclosed linkage operated latching systems will come to mind to those who are skilled in the art.

As will be apparent from the foregoing, the present invention provides a remote signal responsive operating mechanism that can be employed in linkage operated latching systems of a wide variety of types; control boxes that have wide link receiving openings that will accommodate a wide variety of link orientations; and a variety of other latching system features that facilitate the addition of remote signal responsive operating capabilities to may known types of linage operated latching systems. Features of the invention are not limited to being used with any particular types of linkage-operated latch, or to the use of particular kinds of rigid or flexible links. Where desired, remote signal responsive operating mechanisms of the type described herein may be used to replace manually actuated operating mechanism, or to supplement manually actuated operating mechanisms; and, if employed in concert with a manually actuated operating mechanism, will ensure that links that are used by one of the operating mechanisms do not interfere with or cause unwanted movement of the links that are used by the other of the operating mechanisms.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention.

What is claimed is:

1. A latching system mountable on a closure for releasably retaining the closure in a closed position by latchingly engaging spaced first and second striker formations stationed near the position of the closure when the closure is in the closed position, comprising:
    a) first and second latch assemblies mountable on the closure at spaced locations suitable to enable the first latch assembly to latchingly engage the first striker formation when the closure is in the closed position, and to enable the second latch assembly to latchingly engage the second striker formation when the closure is in the closed position;
    b) a first operating mechanism including a control unit mountable on the closure and including an enclosure that houses a first crank arm for pivotal movement about a first pivot axis between a non-operated position and an operated position, and that houses components of a signal responsive relay mechanism having an armature that is connected to the first crank arm for pivoting the first crank arm about the first pivot axis from the non-operated position to the operated position in response to receipt by the signal responsive relay mechanism of a signal sent from a location remote to the closure, and wherein at least one opening is defined by the enclosure for providing access from outside the enclosure to the first crank arm;
    c) a first elongate link configured to extend through the at least one opening of the enclosure and being connectable 1) to the first latch assembly for being moved along a first path of travel from a normal position of the first elongate link to an actuated position of the first elongate link to operate the first latch assembly to release latched engagement of the first latch assembly with the first striker formation, and 2) to the first crank arm at a first location along a length of the first crank arm;

d) a second elongate link configured to extend through the at least one opening of the enclosure and being connectable 1) to the second latch assembly for being moved along a second path of travel from a normal position of the second elongate link to an actuated position of the second elongate link to operate the second latch assembly to release latched engagement of the second latch assembly with the second striker formation, and 2) to the first crank arm at a second location along a length of the first crank arm;

e) whereby, when the first crank arm is pivoted from the non-operated position to the operated position, the first and second links are caused to move along the first and second paths of travel to operate the first and second latch assemblies to substantially concurrently release the latched engagement of the first and second latch assemblies with the first and second striker formations to permit the closure to move away from the closed position;

f) a second operating mechanism connectable to the closure and including interior structure that moves in response to manual operation of an actuator that is accessible from outside the closure;

g) a first actuator link connectable to the first latch assembly and to the interior structure for operating the first latch assembly in response to manual operation of the actuator; and, h) a second actuator link connectable to the second latch assembly and to the interior structure for operating the second latch assembly in response to manual operation of the actuator.

2. The latching system of claim 1 wherein the interior structure includes a second crank arm that is pivotal about a second pivot axis from a non-actuated position to an actuated position for moving the first actuator link and the second actuator link to operate the first and second latch assemblies.

3. The latching system of claim 2 wherein the first actuator link is connectable to the second crank arm at a first site along a length of the second crank arm, and the second actuator link is connectable to the second crank arm at a second site along the length of the second crank arm.

4. The latching system of claim 3 wherein the second operating mechanism is mountable on the closure at a station located between the first and second latch assemblies, and the first and second sites where the first and second actuator links connect with the second crank arm are situated on substantially opposite sides of the second pivot axis so that, when the second crank arm pivots about the second pivot axis from the non-actuated position to the actuated position, the first and second actuator links move in substantially opposite directions to substantially concurrently operate the first and second latch assemblies.

5. The latching system of claim 4 wherein the first latch assembly has a first, one-piece operating arm that connects with the first elongate link and with the first actuator link, and that pivots to operate the first latch assembly in response to movement of a selected one of the first elongate link and the first actuator link, and wherein the second latch assembly has a second, one-piece operating arm that connects with the second elongate link and with the second actuator link, and that pivots to operate the second latch assembly in response to movement of a selected one of the second elongate link and the second actuator link.

6. The latching system of claim 5 wherein the first and second latch assemblies 1) each have a rotary latch bolt pivotally connected to a latch housing for movement between an unlatched position wherein a generally cylindrical portion of one an associated one of the first and second striker formations is permitted to move into and out of aligned portions of U-shaped notches defined by the latch housing and by the rotary latch bolt, and a latched position wherein the U-shaped notches of the latch housing and of the rotary latch bolt cooperate to latchingly retain the generally cylindrical portion of the associated one of the first and second striker formations, 2) each have a pawl that is movable between a retention position wherein the pawl engages the bolt to hold the bolt in the latched position, and a release position wherein the pawl permits the rotary latch bolt to pivot to the unlatched position, and 3) each have at least one spring arranged to bias the rotary latch bolt away from the latched position toward the unlatched position, and to bias the pawl away from the release position toward the retention position.

7. A latching system including an operating mechanism mountable on a closure for operating a first latch assembly and a second latch assembly mounted on the closure to release latched engagement of the first and second latch assemblies with first and second striker formations that retain the closure in a closed position, comprising:

a) a control unit mountable on the closure and including an enclosure that houses a first crank arm for pivotal movement about a first pivot axis between a non-operated position and an operated position, and that houses components of a signal responsive relay mechanism having an armature that is connected to the first crank arm for pivoting the first crank arm about the first pivot axis from the non-operated position to the operated position in response to receipt by the signal responsive relay mechanism of a signal sent from a location remote to the closure, and wherein at least one opening is defined by the enclosure for providing access from outside the enclosure to the first crank arm;

b) a first elongate link configured to extend through the at least one opening of the enclosure and being connectable 1) to the first latch assembly for being moved along a first path of travel from a normal position of the first elongate link to an actuated position of the first elongate link to operate the first latch assembly to release latched engagement of the first latch assembly with the first striker formation, and 2) to the first crank arm at a first location along a length of the first crank arm;

c) a second elongate link configured to extend through the at least one opening of the enclosure and being connectable 1) to the second latch assembly for being moved along a second path of travel from a normal position of the second elongate link to an actuated position of the second elongate link to operate the second latch assembly to release latched engagement of the second latch assembly with the second striker formation, and 2) to the first crank arm at a second location along a length of the first crank arm;

d) whereby, when the first crank arm is pivoted from the non-operated position to the operated position, the first and second links are caused to move along the first and second paths of travel to operate the first and second latch assemblies to substantially concurrently release the latched engagement of the first and second latch assemblies with the first and second striker formations to permit the closure to move away from the closed position;

e) wherein the enclosure of the control unit includes a base and a cover that cooperate to protectively house the first crank arm and the signal responsive relay mechanism; and, f) wherein the base is formed primarily from injection molded plastics material, wherein the first crank arm is pivotally connected to the base for pivoting between the non-operated position and the operated position, and the signal responsive relay mechanism is connected to the base.

8. The latching system of claim 7 wherein the signal responsive relay mechanism includes an electrically operated relay and a signal responsive switch mechanism for supplying electricity to the electrically operated relay to operate the relay to move the armature of the relay to pivot the first crank arm from the non-operated position to the operated position in response to receipt by the signal responsive relay mechanism of said signal.

9. The latching system of claim 7 wherein the cover is formed primarily from injection molded plastics material and provides a mounting location where an electric light assembly can be mounted on the cover for illuminating an area exterior to the enclosure of the control unit.

10. The latching system of claim 9 additionally including an electric light assembly mounted on the cover at said mounting location.

11. A latching system including a first operating mechanism mountable on a closure for operating a first latch assembly and a second latch assembly mounted on the closure to release latched engagement of the first and second latch assemblies with first and second striker formations that retain the closure in a closed position, comprising:

a) a control unit mountable on the closure and including an enclosure that houses a first crank arm for pivotal movement about a first pivot axis between a non-operated position and an operated position, and that houses components of a signal responsive relay mechanism having an armature that is connected to the first crank arm for pivoting the first crank arm about the first pivot axis from the non-operated position to the operated position in response to receipt by the signal responsive relay mechanism of a signal sent from a location remote to the closure, and wherein at least one opening is defined by the enclosure for providing access from outside the enclosure to the first crank arm;

b) a first elongate link configured to extend through the at least one opening of the enclosure and being connectable 1) to the first latch assembly for being moved along a first path of travel from a normal position of the first elongate link to an actuated position of the first elongate link to operate the first latch assembly to release latched engagement of the first latch assembly with the first striker formation, and 2) to the first crank arm at a first location along a length of the first crank arm;

c) a second elongate link configured to extend through the at least one opening of the enclosure and being connectable 1) to the second latch assembly for being moved along a second path of travel from a normal position of the second elongate link to an actuated position of the second elongate link to operate the second latch assembly to release latched engagement of the second latch assembly with the second striker formation, and 2) to the first crank arm at a second location along a length of the first crank arm;

d) whereby, when the first crank arm is pivoted from the non-operated position to the operated position, the first and second links are caused to move along the first and second paths of travel to operate the first and second latch assemblies to substantially concurrently release the latched engagement of the first and second latch assemblies with the first and second striker formations to permit the closure to move away from the closed position;

e) a second operating mechanism connectable to the closure and including interior structure that moves in response to manual operation of an actuator that is accessible from outside the closure;

f) a first actuator link connectable to the first latch assembly and to the interior structure for operating the first latch assembly in response to manual operation of the actuator; and, g) a second actuator link connectable to the second latch assembly and to the interior structure for operating the second latch assembly in response to manual operation of the actuator.

12. The latching system of claim 11 wherein the interior structure includes a second crank arm that is pivotal about a second pivot axis from a non-actuated position to an actuated position for moving the first actuator link and the second actuator link to operate the first and second latch assemblies.

13. The latching system of claim 12 wherein the first actuator link is connectable to the second crank arm at a first site along a length of the second crank arm, and the second actuator link is connectable to the second crank arm at a second site along the length of the second crank arm.

14. The latching system of claim 13 wherein the second operating mechanism is mountable on the closure at a station located between the first and second latch assemblies, and the first and second sites where the first and second actuator links connect with the second crank arm are situated on substantially opposite sides of the second pivot axis so that, when the second crank arm pivots about the second pivot axis from the non-actuated position to the actuated position, the first and second actuator links move in substantially opposite directions to substantially concurrently operate the first and second latch assemblies.

15. The latching system of claim 14 wherein the first latch assembly has a first, one-piece operating arm that connects with the first elongate link and with the first actuator link, and that pivots to operate the first latch assembly in response to movement of a selected one of the first elongate link and the first actuator link, and wherein the second latch assembly has a second, one-piece operating arm that connects with the second elongate link and with the second actuator link, and that pivots to operate the second latch assembly in response to movement of a selected one of the second elongate link and the second actuator link.

16. The latching system of claim 15 wherein the first and second latch assemblies 1) each have a rotary latch bolt pivotally connected to a latch housing for movement between an unlatched position wherein a generally cylindrical portion of one an associated one of the first and second striker formations is permitted to move into and out of aligned portions of U-shaped notches defined by the latch housing and by the rotary latch bolt, and a latched position wherein the U-shaped notches of the latch housing and of the rotary latch bolt cooperate to latchingly retain the generally cylindrical portion of the associated one of the first and second striker formations, 2) each have a pawl that is movable between a retention position wherein the pawl engages the bolt to hold the bolt in the latched position, and a release position wherein the pawl permits the rotary latch bolt to pivot to the unlatched position, and 3) each have at least one spring arranged to bias the rotary latch bolt away from the latched position toward the unlatched position, and to bias the pawl away from the release position toward the retention position.

17. A latching system mountable on a closure for latchingly engaging first and second striker formations for holding the closure in a closed position, comprising:
   a) first and second latch assemblies mountable on the closure to latchingly engage the striker formations when the closure is in the closed position, and functioning, when operated, to release latched engagement with the striker formations;
   b) a first operating mechanism mountable on the closure being connectable to the first and second latch assemblies for operating the first and second latch assemblies substantially concurrently in response to manual actuation of the first operating mechanism;
   c) a second operating mechanism mountable on the closure for substantially concurrently operating the first and second latch assemblies in response to receipt of a remotely sent signal, including:
      i) a control unit mountable on the closure and including an enclosure that houses a first crank arm for pivotal movement about a first pivot axis between a non-operated position and an operated position, and that houses components of a signal responsive relay mechanism having an armature that is connected to the first crank arm for pivoting the first crank arm about the first pivot axis from the non-operated position to the operated position in response to receipt by the signal responsive relay mechanism of a signal sent from a location remote to the closure, and wherein at least one opening is defined by the enclosure for providing access from outside the enclosure to the first crank arm;
      ii) a first elongate link configured to extend through the at least one opening of the enclosure and being connectable 1) to the first latch assembly for being moved along a first path of travel from a normal position of the first elongate link to an actuated position of the first elongate link to operate the first latch assembly to release latched engagement of the first latch assembly with the first striker formation, and 2) to the first crank arm at a first location along a length of the first crank arm;
      iii) a second elongate link configured to extend through the at least one opening of the enclosure and being connectable 1) to the second latch assembly for being moved along a second path of travel from a normal position of the second elongate link to an actuated position of the second elongate link to operate the second latch assembly to release latched engagement of the second latch assembly with the second striker formation, and 2) to the first crank arm at a second location along a length of the first crank arm;
      iv) whereby, when the first crank arm is pivoted from the non-operated position to the operated position, the first and second links are caused to move along the first and second paths of travel to operate the first and second latch assemblies to substantially concurrently release the latched engagement of the first and second latch assemblies with the first and second striker formations to permit the closure to move away from the closed position.

18. The latching system of claim 17 wherein the control unit is mountable on the closure at a location between the first and second latch assemblies, the at least one opening defined by the enclosure includes first and second openings located on substantially opposite sides of the enclosure, the first elongate link extends through the first opening, the second elongate link extends through the second opening, and the first and second locations where the first and second elongate links connect with the first crank arm are situated on substantially opposite sides of the first pivot axis so that, when the first crank arm pivots from the non-operated position to the operated position, the first and second elongate links move in substantially opposite directions to substantially concurrently operate the first and second latch assemblies.

19. The latching system of claim 17 wherein the enclosure of the control unit includes a base and a cover that cooperate to protectively house the first crank arm and the signal responsive relay mechanism.

20. The latching system of claim 19 wherein the base is formed primarily from injection molded plastics material, wherein the first crank arm is pivotally connected to the base for pivoting between the non-operated position and the operated position, and the signal responsive relay mechanism is connected to the base.

21. The latching system of claim 20 wherein the signal responsive relay mechanism includes an electrically operated relay and a signal responsive switch mechanism for supplying electricity to the electrically operated relay to operate the relay to move the armature of the relay to pivot the first crank arm from the non-operated position to the operated position in response to receipt by the signal responsive relay mechanism of said signal.

22. The latching system of claim 20 wherein the cover is formed primarily from injection molded plastics material and provides a mounting location where an electric light assembly can be mounted on the cover for illuminating an area exterior to the enclosure of the control unit.

23. The latching system of claim 22 additionally including an electric light assembly mounted on the cover at said mounting location.

24. The latching system of claim 17 additionally including:
   a) a second operating mechanism connectable to the closure and including interior structure that moves in response to manual operation of an actuator that is accessible from outside the closure;
   b) a first actuator link connectable to the first latch assembly and to the interior structure for operating the first latch assembly in response to manual operation of the actuator; and,
   c) a second actuator link connectable to the second latch assembly and to the interior structure for operating the second latch assembly in response to manual operation of the actuator.

25. The latching system of claim 24 wherein the interior structure includes a second crank arm that is pivotal about a second pivot axis from a non-actuated position to an actuated position for moving the first actuator link and the second actuator link to operate the first and second latch assemblies.

26. The latching system of claim 25 wherein the first actuator link is connectable to the second crank arm at a first site along a length of the second crank arm, and the second actuator link is connectable to the second crank arm at a second site along the length of the second crank arm.

27. The latching system of claim 26 wherein the second operating mechanism is mountable on the closure at a station located between the first and second latch assemblies, and the first and second sites where the first and second actuator links connect with the second crank arm are situated on substantially opposite sides of the second pivot axis so that, when the second crank arm pivots about the second pivot axis from the non-actuated position to the actuated position, the first and second actuator links move in substantially opposite directions to substantially concurrently operate the first and second latch assemblies.

28. The latching system of claim 27 wherein the first latch assembly has a first, one-piece operating arm that connects with the first elongate link and with the first actuator link, and that pivots to operate the first latch assembly in response to movement of a selected one of the first elongate link and the first actuator link, and wherein the second latch assembly has a second, one-piece operating arm that connects with the second elongate link and with the second actuator link, and that pivots to operate the second latch assembly in response to movement of a selected one of the second elongate link and the second actuator link.

29. The latching system of claim 28 wherein the first and second latch assemblies 1) each have a rotary latch bolt pivotally connected to a latch housing for movement between an unlatched position wherein a generally cylindrical portion of one an associated one of the first and second striker formations is permitted to move into and out of aligned portions of U-shaped notches defined by the latch housing and by the rotary latch bolt, and a latched position wherein the U-shaped notches of the latch housing and of the rotary latch bolt cooperate to latchingly retain the generally cylindrical portion of the associated one of the first and second striker formations, 2) each have a pawl that is movable between a retention position wherein the pawl engages the bolt to hold the bolt in the latched position, and a release position wherein the pawl permits the rotary latch bolt to pivot to the unlatched position, and 3) each have at least one spring arranged to bias the rotary latch bolt away from the latched position toward the unlatched position, and to bias the pawl away from the release position toward the retention position.

* * * * *